(12) United States Patent
Stowell et al.

(10) Patent No.: US 11,462,728 B2
(45) Date of Patent: Oct. 4, 2022

(54) STRUCTURED COMPOSITE MATERIALS

(71) Applicant: Lyten, Inc., Sunnyvale, CA (US)

(72) Inventors: Michael W. Stowell, Sunnyvale, CA (US); Bryce H. Anzelmo, Mountain View, CA (US); David Tanner, Yuba City, CA (US); Bruce Lanning, Littleton, CO (US); Joe Griffith Cruz, San Jose, CA (US)

(73) Assignee: Lyten, Inc., San Jose, CA (US)

(*) Notice: Subject to any disclaimer, the term of this patent is extended or adjusted under 35 U.S.C. 154(b) by 0 days.

(21) Appl. No.: 16/997,417

(22) Filed: Aug. 19, 2020

(65) Prior Publication Data

US 2020/0381708 A1 Dec. 3, 2020

Related U.S. Application Data

(63) Continuation of application No. 16/223,785, filed on Dec. 18, 2018, now Pat. No. 10,756,334.

(60) Provisional application No. 62/610,018, filed on Dec. 22, 2017.

(51) Int. Cl.
| | |
|---|---|
| *H01M 4/1393* | (2010.01) |
| *H01M 4/04* | (2006.01) |
| *H01M 4/36* | (2006.01) |
| *H01M 4/38* | (2006.01) |
| *H01M 4/62* | (2006.01) |
| *H01M 4/02* | (2006.01) |

(Continued)

(52) U.S. Cl.
CPC ......... *H01M 4/1393* (2013.01); *C01B 32/182* (2017.08); *H01M 4/0404* (2013.01); *H01M 4/0421* (2013.01); *H01M 4/366* (2013.01); *H01M 4/38* (2013.01); *H01M 4/625* (2013.01); *B82Y 30/00* (2013.01); *H01M 2004/021* (2013.01)

(58) Field of Classification Search
CPC ...... H01M 4/1393; H01M 4/625; B82Y 30/00
USPC .......... 252/500, 510, 511; 429/213; 977/948
See application file for complete search history.

(56) References Cited

U.S. PATENT DOCUMENTS

| | | |
|---|---|---|
| 5,143,709 A | 9/1992 | Labes |
| 5,595,837 A | 1/1997 | Olsen et al. |
| 5,605,961 A | 2/1997 | Lee et al. |

(Continued)

FOREIGN PATENT DOCUMENTS

| | | |
|---|---|---|
| CN | 105084769 A | 11/2015 |
| CN | 104528690 B | 8/2016 |

(Continued)

OTHER PUBLICATIONS

Bakir "Novel metal-carbon nanomaterials: A review on covetics." Adv Mat Lett 2017, 8(9), 884-890 (Year: 2017).*

(Continued)

*Primary Examiner* — Tri V Nguyen
(74) *Attorney, Agent, or Firm* — Paradice & Li LLP

(57) ABSTRACT

A method of producing a structured composite material is described. A porous media is provided, an electrically conductive material is deposited on surfaces or within pores of the plurality of porous media particles, and an active material is deposited on the surfaces or within the pores of the plurality of porous media particles coated with the electrically conductive material to coalesce the plurality of porous media particles together and form the structured composite material.

23 Claims, 19 Drawing Sheets

(51) Int. Cl.
*B82Y 30/00* (2011.01)
*C01B 32/182* (2017.01)

(56) References Cited

U.S. PATENT DOCUMENTS

| | | | |
|---|---|---|---|
| 6,156,114 | A | 12/2000 | Bell et al. |
| 6,383,301 | B1 | 5/2002 | Bell et al. |
| 6,692,718 | B1 | 2/2004 | Osawa |
| 6,759,474 | B1 | 7/2004 | Keener et al. |
| 7,623,340 | B1 | 11/2009 | Song et al. |
| 7,790,243 | B2 | 9/2010 | Radhakrishnan et al. |
| 8,034,321 | B2 | 10/2011 | Mauthner et al. |
| 8,222,579 | B2 | 7/2012 | Taguchi et al. |
| 8,632,633 | B2 | 1/2014 | Barker et al. |
| 8,821,745 | B2 | 9/2014 | Luo et al. |
| 9,005,809 | B2 | 4/2015 | Wilkening et al. |
| 9,051,185 | B2 | 6/2015 | Levendis et al. |
| 9,190,667 | B2 | 11/2015 | Zhamu et al. |
| 9,419,274 | B2 | 8/2016 | Wilkening et al. |
| 9,576,694 | B2 | 2/2017 | Gogotsi et al. |
| 9,721,734 | B2 | 8/2017 | Ryu et al. |
| 9,994,960 | B2 | 6/2018 | Laramie et al. |
| 10,117,806 | B2 | 11/2018 | Chang et al. |
| 10,160,688 | B2 | 12/2018 | Amin et al. |
| 10,428,197 | B2 | 10/2019 | Anzelmo et al. |
| 10,862,129 | B2 | 12/2020 | Pan et al. |
| 10,998,552 | B2 | 5/2021 | Lanning et al. |
| 11,008,436 | B2 | 5/2021 | Anzelmo et al. |
| 11,127,941 | B2 | 9/2021 | Lanning et al. |
| 11,127,942 | B2 | 9/2021 | Gazda et al. |
| 11,133,495 | B2 | 9/2021 | Gazda et al. |
| 2005/0123467 | A1 | 6/2005 | Harutyunyan |
| 2009/0220767 | A1 | 9/2009 | Schlogl et al. |
| 2009/0269667 | A1* | 10/2009 | Antonietti ............... H01G 11/86 429/231.4 |
| 2010/0056819 | A1 | 3/2010 | Jang et al. |
| 2010/0206363 | A1 | 8/2010 | Choi |
| 2011/0123897 | A1 | 5/2011 | Kawaji et al. |
| 2011/0186789 | A1 | 8/2011 | Samulski et al. |
| 2011/0206946 | A1 | 8/2011 | Schmidt et al. |
| 2012/0107680 | A1 | 5/2012 | Amiruddin et al. |
| 2012/0244033 | A1* | 9/2012 | Shugart ................ C22C 21/10 420/532 |
| 2013/0310495 | A1 | 11/2013 | Kim et al. |
| 2014/0030181 | A1 | 1/2014 | Liu et al. |
| 2014/0106141 | A1 | 4/2014 | Bellman et al. |
| 2014/0106150 | A1 | 4/2014 | Decker et al. |
| 2014/0313636 | A1 | 10/2014 | Tour et al. |
| 2015/0232343 | A1 | 8/2015 | Liu et al. |
| 2015/0344643 | A1 | 12/2015 | Al-Harthi et al. |
| 2016/0043384 | A1* | 2/2016 | Zhamu ................. H01M 4/366 429/231.4 |
| 2016/0104882 | A1* | 4/2016 | Yushin ................. H01M 4/625 429/233 |
| 2016/0207291 | A1 | 7/2016 | Dimitrakopoulos et al. |
| 2016/0315326 | A1* | 10/2016 | Shin ...................... H01M 4/663 |
| 2016/0351886 | A1* | 12/2016 | Braun .................. H01M 4/505 |
| 2016/0376430 | A1 | 12/2016 | Kusumoto et al. |
| 2017/0077490 | A1 | 3/2017 | Zhang et al. |
| 2017/0213656 | A1* | 7/2017 | Duan .................... H01G 11/28 |
| 2018/0058782 | A1 | 3/2018 | Zhamu et al. |
| 2018/0073110 | A1 | 3/2018 | Balachandran et al. |
| 2018/0099871 | A1 | 4/2018 | Tanner et al. |
| 2018/0327611 | A1 | 11/2018 | Scheffer |
| 2019/0233611 | A1 | 8/2019 | Nosker et al. |
| 2019/0264004 | A1 | 8/2019 | Stowell et al. |
| 2019/0363340 | A1 | 11/2019 | Ates et al. |
| 2020/0017645 | A1 | 1/2020 | Nosker et al. |
| 2020/0172705 | A1 | 6/2020 | Stowell et al. |
| 2020/0278316 | A1 | 9/2020 | Stowell et al. |
| 2021/0036312 | A1 | 2/2021 | Lanning et al. |
| 2021/0057751 | A1 | 2/2021 | Lanning et al. |
| 2021/0057753 | A1 | 2/2021 | Viner et al. |
| 2021/0126258 | A1 | 4/2021 | Bell et al. |
| 2021/0126286 | A1 | 4/2021 | Rogojina et al. |
| 2021/0126287 | A1 | 4/2021 | Rogojina et al. |
| 2021/0210753 | A1 | 7/2021 | Gazda et al. |
| 2021/0242505 | A1 | 8/2021 | Gazda et al. |
| 2021/0257666 | A1 | 8/2021 | Huang et al. |
| 2021/0257667 | A1 | 8/2021 | Gazda et al. |
| 2021/0351406 | A1 | 11/2021 | Kumar et al. |
| 2021/0367241 | A1 | 11/2021 | Kumar et al. |
| 2022/0041491 | A1 | 2/2022 | Stowell et al. |
| 2022/0041498 | A1 | 2/2022 | Stowell et al. |
| 2022/0041499 | A1 | 2/2022 | Stowell et al. |

FOREIGN PATENT DOCUMENTS

| | | |
|---|---|---|
| CN | 106067542 A | 11/2016 |
| CN | 106398802 A | 2/2017 |
| CN | 107078287 A | 8/2017 |
| CN | 109054151 A | 12/2018 |
| EP | 0390383 A1 | 10/1990 |
| EP | 1281680 A2 | 2/2003 |
| EP | 2744751 A2 | 6/2014 |
| JP | 201472793 A | 9/2014 |
| WO | 2015/099462 A1 | 7/2015 |
| WO | 2016/135328 A1 | 9/2016 |
| WO | 2018/148044 A2 | 8/2018 |
| WO | 2019/126196 A1 | 6/2019 |
| WO | 2019/168967 A1 | 9/2019 |
| WO | 2021/080664 A1 | 4/2021 |
| WO | 2021/158395 A1 | 8/2021 |

OTHER PUBLICATIONS

Andrews, R. et al., "Carbon nanotybe polymer composites", Current Opinion in Solid State and Materials Science, vol. 8, (2004), pp. 31-37.

Bakir, M. et al., "Novel metal-carbon nanomaterials: A review on covetics", Advanced Materials Letters, vol. 8, No. 9, pp. 884-890; 2017.

International Search Report and Written Opinion dated Apr. 11, 2019 for PCT Appl. No PCT/US2018/066271; 12 pages.

International Search Report and Written Opinion dated Jun. 12, 2019 for PCT Appl No. PCT/US2019/019812; 9 pages.

Kowbel et al., Effect of carbon fabric whiskerization on mechanical properties of C-C composites, Composites Part A: Applied Science and Manufacturing, vol. 28, Issue 12, 1997, Available online May 20, 1998, 993-1000.

Mittal et al., A review on carbon nanotubes and graphene as fillers in reinforced polymer nanocomposites. Journal of Industrial and Engineering Chemistry, 21, 2015, Available online Mar. 18, 2014, pp. 11-25.

Tikhomirov et al., The chemical vapor infiltration of exfoliated graphite to produce carbon/carbon composites, Carbon, vol. 49, Issue 1, Jan. 2011, pp. 147-153.

Wang, H. et al., "Improvement of interfacial interaction and mechanical properties in copper matrix composites reinforced with copper coated carbon nanotubes", Materials and Sci. Eng. A, vol. 715, pp. 163-173; Feb. 7, 2018.

Allaire, A. et al., "Fracture Behavior and Intrinsic Strength of FPD Substrates", Technical Information Paper 203 Corning Incorporated, Corning, NY; Nov. 2004; 5 pages. (Paper presented at SID 1996, San Diego, CA).

Chen, L. et al., "PEO/garnet composite electrolytes for solid-state lithium batteries: From "ceramic-in-polymer" to "polymer-in-ceramic"," Nano Energy; vol. 46, Jan. 2018; pp. 176-184.

Cheng, X. et al., "Toward Safe Lithium Metal Anode in Rechargeable Batteries: A Review", Chemical Reviews; vol. 117; Jul. 28, 2017; pp. 10403-10473.

Critchley, L., "What are the Optical Properties of Graphene?", Mar. 19, 2019 (printed from https://www.azooptics.com/Article.aspx?ArticleID=1537); 4 pages.

Fang, C. et al., "Key Issues Hindering a Practical Lithium-Metal Anode", Trends in Chemistry, TRECHM 26, 2019; 7 pages.

Fu, K. et al., "Flexible, solid-state, ion-conducting membrane with 3D garnet nanofiber networks for lithium batteries", PNAS, vol. 113, No. 26; Jun. 28, 2016; pp. 7094-7099.

(56) References Cited

OTHER PUBLICATIONS

Gao, Y. et al., "Polymer-inorganic solid-electrolyte interphase for stable lithium metal batteries under lean electrolyte conditions", Pennsylvania State University, University Park, PA; (date unknown); 9 pages.

International Search Report and Written Opinion dated Apr. 28, 2021 for PCT Appl. No PCT/US2021/015098; 9 pages.

Kang, H. et al., "Thirty-minute synthesis of hierarchically ordered sulfur particles enables high-energy, flexible lithium-sulfur batteries", Nano Energy, vol. 89; Aug. 25, 2021; 10 pages.

Kim, J. et al., "Improved Cycling Performance of Lithium-Oxygen Cells by Use of a Lithium Electrode Protected with Conductive Polymer and Aluminum Fluoride", ACS Applied Materials & Interfaces; vol. 8; Nov. 9, 2016; pp. 32300-32306.

Liu, R. et al., "A self-standing, UV-cured semi-interpenetrating polymer network reinforced composite gel electrolytes tor dendrite-suppressing lithium ion batteries", Journal of Materiomics; vol. 5, Jun. 2019; pp. 185-194.

Liu, Y. et al., "An Artificial Solid Electrolyte Interphase with High Li-Ion Conductivity, Mechanical Strength, and Flexibility for Stable Lithium Metal Anodes", Advanced Materials; vol. 29, 1605531; 2017; 8 pages.

Moriche, R. et al., "Graphene nanoplatelets coated glass fibre fabrics as strain sensors", Composites Science and Technology, vol. 146; Apr. 15, 2017; pp. 59-64.

"Nanotechnologies—Vocabulary—Part 13: Graphene and related two-dimensional (2D) materials", ISO/TS 80004-13:2017 (printed from https://www.iso.org/obp/ui/#iso:std:iso:ts:80004:-13:ed-1:v1:en on Dec. 14, 2020 (19 pages).

Ovid'ko, I. et al., "Toughening due to crack deflection in ceramic- and metal-graphene nanocomponents", Rev. Adv. Mater. Sci., vol. 43; Sep. 15, 2015; pp. 52-60.

Pang, Q., et al., "Elastic and Li-ion-percolating hybrid membrane stabilizes Li metal plating", PNAS, vol. 115, No. 49; Dec. 4, 2018; pp. 12389-12394.

Soboleva et al., "On the Micro-, Meso-, and Macroporous Structures of Polymer Electrolyte Membrane Fuel Cell Catalyst Layers", 2, 2 ACS Appl. Mater. Interfaces, pp. 375-384 (2010).

Sun, C. et al., "An ion-conductive Li1.5Al0.5Ge1.5(PO4)3-based composite protective layer for lithium metal anode in lithium-sulfur batteries", Journal of Power Sources, vol. 377, Jan. 2018; pp. 36-43.

Sun, J. et al., "Graphene Glass from Direct CVD Routes: Production and Applications", Materials Views; vol. 28 (2016); pp. 10333-10339.

Wang, F. et al., "Size effect of graphene nanoplatelets on the morphology and mechanical behavior of glass fiber/epoxy composites", J. Mater. Sci., vol. 51; (2016) published online Dec. 17, 2015; pp. 3337-3348.

"Why Does Glass Break?" Part 2—Behind the Glass; Coming Museum of Glass; Corning, Inc., Corning, NY; Jun. 3, 2015 (printed from https://blog.cmog.org/2015/06/03/part-2-why-does-glass-break/ on Dec. 14, 2020); 8 pages.

Xie, Z. et al., "Layer thickness effects on the strengthening and toughening mechanisms in metallic glass-graphene Tanolaminates", Computational Materials Science, vol. 177, No. 109536; Feb. 4, 2020; 8 pages.

Xu, R. et al., "Artificial Interphases for Highly Stable Lithium Metal Anode", Matter, vol. 1, Aug. 7, 2019, pp. 317-344.

Yang, B. et al., "Temperature effect on graphene-filled interface between glass-carbon hybrid fibers and epoxy resin characterized by fiber-bundle pull-out test", J. Appl. Polym. Sci., No. 46263; Jan. 2018; 11 pages.

Zaheer, U. et al., "A treatise on multiscale glass fiber epoxy matrix composites containing graphene nanoplatelets", Advanced Composites and Hybrid Materials; vol. 1; Aug. 29, 2018; pp. 705-721.

Zhang, B. et al., "Mechanical and Thermal Properties of Hierarchical Composites Enhanced by Pristine Graphene and Graphene Oxide Nanoinclusions", J. Appl. Polym. Sci., No. 40826; Apr. 2014; 9 pages.

Zhao, Y. et al., "Anode Interface Engineering and Architecture Design for High-Performance Lithium-Sulfur Batteries", Advanced Materials; 1806532; 2019; 27 pages.

Zhou, H. et al., "Protective coatings for lithium metal anodes: Recent progress and future perspectives", Journal of Power Sources; vol. 450; Jan. 2020; 18 pages.

Liu, R. et al., "Mass Production of 3D Connective Graphene Networks by Fluidized Bed Chemical Vapor Deposition and Its Application in High Performance Lithium-Sulfur Battery", Nanomaterials; vol. 12, No. 150; Dec. 31, 2021; 13 pages.

International Search Report and Written Opinion dated Aug. 7, 2019 for PCT Patent Application Serial No. PCT/US2019/029445; 10 pages.

International Search Report and Written Opinion dated Nov. 13, 2020 for PCT Patent Application Serial No. PCT/US2020/044488; 16 pages.

International Search Report and Written Opinion dated Nov. 10, 2021 for PCT Appl. No. PCT/US2021/042994; 8 pages.

Kumar et al., "Carbon nanotube arrays decorated with multi-layer graphene-nanopetals enhance mechanical strength and durability", Carbon, vol. 84, pp. 236-245; Dec. 4, 2014.

Mialesevic et al., "Synthesis of few-layer graphene via microwave plasma-enhanced chemical vapour deposition", Nanotechnology; vol. 19; 2008.

Onoue et al., "Fine structure analysis of spherical carbon particles produced in a methane plasma", Diamond and Related Materials, vol. 27, Jul.-Aug. 2012, pp. 10-13.

Rout et al., "Synthesis of chemically bonded CNT-graphene heterostructure arrays", RSC Advances; vol. 2, No. 22; pp. 8250-8253; 2012.

Seo, H. et al., "Compatibility of Functionalized Graphene with Polyethylene and Its Copolymers", Hindawi Publishing Corp., Journal of Nanomaterials, vol. 2013, Article ID 805201; Sep. 2013; 8 pages.

\* cited by examiner

STRUCTURED COMPOSITE MATERIALS

CROSS-REFERENCE TO RELATED APPLICATIONS

This application is a continuation application and claims the benefit of U.S. patent application Ser. No. 16/223,785 entitled "STRUCTURED COMPOSITE MATERIALS" and filed on Dec. 18, 2018, which claims the benefit of U.S. Provisional Patent Application No. 62/610,018 entitled "Structured Composite Materials" and filed on Dec. 22, 2017, all of which are assigned to the assignee hereof. The disclosures of all prior applications are considered part of and are incorporated by reference in this patent application.

BACKGROUND

Mixtures of materials that include an active material component and an electrically conductive material component are useful in many applications, such as electronics, automotive and aerospace. Such mixtures of materials often benefit from some underlying structure. For example, some structural composites utilize a fibrous web or weave of material with high tensile strength to provide strength in one or two directions, embedded in a matrix material with a lower elastic modulus to provide flexibility. Another application that benefits from an underlying structure within a mixture of active and conductive materials are battery electrodes.

The surface area of the active material or the conductive component can also be important. A high surface area can provide a high interfacial area either between the active material and the conductive material, or upon which reactions can take place. In some instances, carbon allotropes are used as the conductive material component in such mixed structured materials because they can be produced with high electrical and thermal conductivities, and with high surface areas.

SUMMARY

In some embodiments, a method of producing a structured composite material comprises providing a porous media, depositing an electrically conductive material on surfaces or within pores of the plurality of porous media particles, and depositing an active material on the surfaces or within the pores of the plurality of porous media particles coated with the electrically conductive material to coalesce the plurality of porous media particles together and form the structured composite material. In some cases, the porous media comprises a plurality of porous media particles.

In some embodiments, the above method further includes forming the plurality of porous media particles using a method comprising providing a process input material, and converting the process input material into separated components by adding energy to the process input material, wherein one of the separated components comprises the plurality of porous media particles, and the converting of the process input material occurs at a pressure of at least 0.1 atmosphere.

In some embodiments of the above method, the forming the plurality of porous media particles occurs in a first region of a reactor, and the depositing the electrically conductive material occurs in a second region of the reactor, wherein the first and the second regions of the reactor are arranged such that the porous media exits the first region of the reactor and enters the second region of the reactor without being exposed to an environment containing more than 100 ppm of oxygen.

In some embodiments, a method of producing a structured composite material comprises providing a porous media, providing a plurality of conductive particles, forming a carrier fluid mixture by mixing the plurality of porous media particles and the plurality of conductive particles in a carrier fluid, and coalescing the plurality of porous media particles and the plurality of conductive particles together using an electrically conductive material that is deposited on surfaces of or within pores of the plurality of porous media particles and the plurality of conductive particles to form a first structured composite material. In some cases, the porous media comprises a plurality of porous media particles.

In some embodiments, the above method further includes forming the plurality of porous media particles using a method comprising providing a first process input material, and converting the first process input material into first separated components by adding energy to the first process input material, wherein one of the first separated components comprises the plurality of porous media particles, and the converting of the first process input material occurs at a pressure of at least 0.1 atmosphere. In some embodiments, the above method also includes forming the plurality of conductive particles using a method comprising providing a second process input material, and converting the second process input material into second separated components by adding energy to the second process input material, wherein one of the second separated components comprises the plurality of conductive particles, and the converting of the second process input material occurs at a pressure of at least 0.1 atmosphere.

In some embodiments of the above method the forming the plurality of porous media particles occurs in a first region of a reactor, the forming the plurality of conductive particles occurs in a second region of a reactor, and the depositing the electrically conductive material occurs in a third region of a reactor, wherein the first, second and third regions of the reactor are arranged such that the porous media and conductive particles exit the first and second regions of the reactor, respectively, and enter the third region of the reactor without being exposed to an environment containing more than 100 ppm of oxygen.

DETAILED DESCRIPTION

Figure 1:
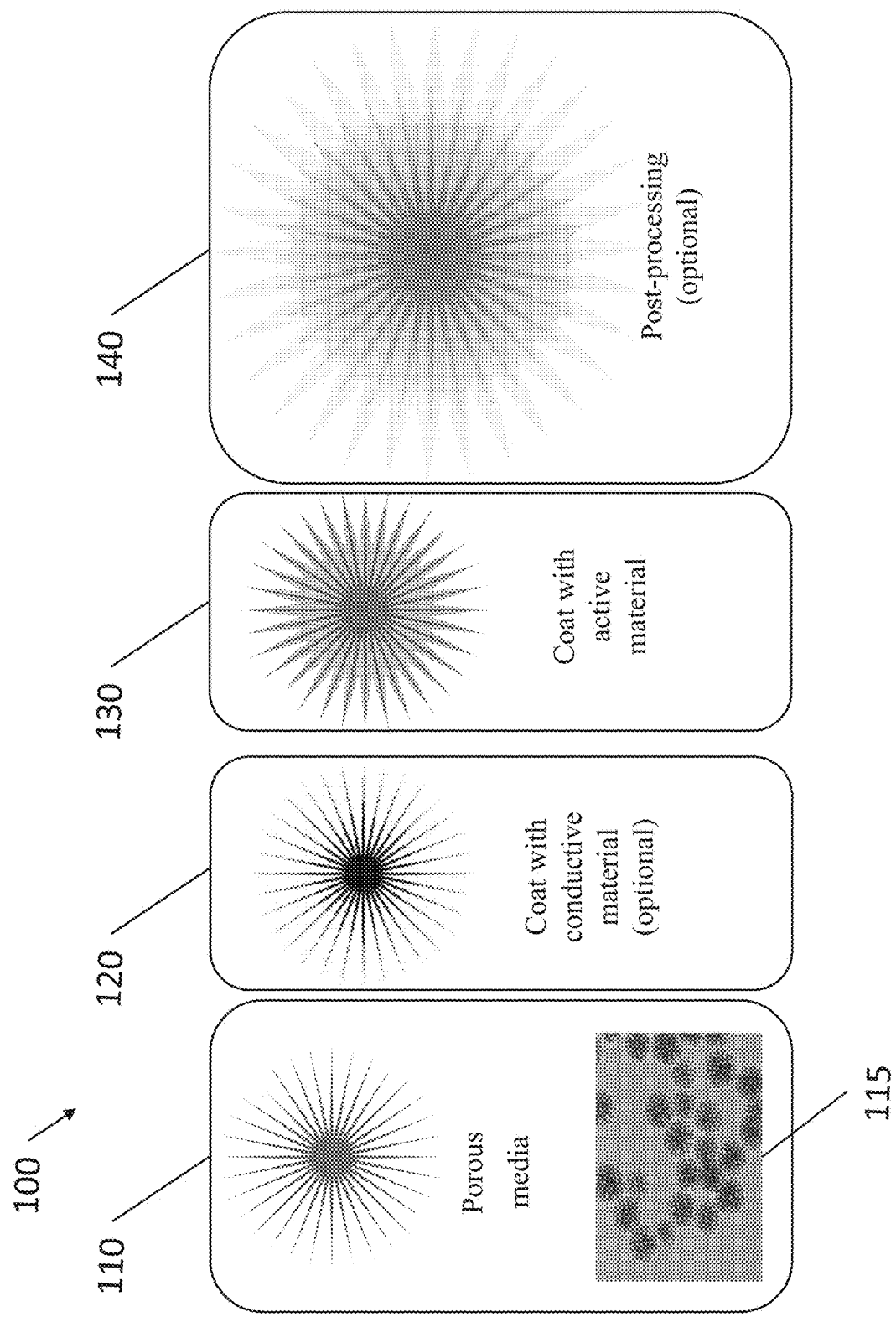
FIG. 1 illustrates a process for forming a structured composite material (SCM) from porous media, an optional electrically conductive material (ECM), and an active material, in accordance with some embodiments.

In the present disclosure, compositions and methods for making structured composite materials (SCMs) are described. In different embodiments, the SCMs can contain different combinations of porous media, conductive particles, electrically conductive materials (ECMs), and/or active materials. In some embodiments, the porous media provides a structural framework (or scaffold) and the ECM provides high electrical conductivity to the SCM. In some cases, the ECM is deposited on the surfaces and/or in the pores of the porous media and forms a continuous (or semi-continuous, with some disconnected regions and/or islands) matrix and/or a coating throughout the SCM. In some cases, the porous media and the conductive particles are coalesced (or, welded together) by depositing an ECM. The resulting SCMs contain the porous media and conductive particles embedded in a matrix of the ECM. In some cases, the active material is deposited on the surfaces and/or in the pores of the ECM and provides activity (e.g., energy storage capacity) to the SCM.

The present SCMs can be tailored for use as energy storage materials, electronic materials, optical materials, structural materials, and others. The chemical composition and morphology of the porous media, conductive particles and/or the ECM in the SCMs can be different in different applications. For example, active materials can include materials for batteries, capacitors, sensors, inks, fuel cells, printed circuits, Internet of Things (IoT) applications, metamaterials for electromagnetic films, electrochemical sensors, and materials for impedance spectroscopy, aerospace applications, automotive industries, light absorbing applications, electro-optics systems, satellites, or telescopes. In some embodiments, the active material is deposited within the pores of the porous media, the pores of the conductive particles, and/or the pores of the ECM material, and the resulting SCMs have improved properties compared to conventional composites.

For example, a high capacity and durable battery electrode (e.g., a cathode in a lithium ion battery) can be produced from an SCM containing mesoporous carbon as the porous media and sulfur-containing active material deposited within the pores of the mesoporous carbon. Other applications for SCMs include fuel cell and flow battery electrodes, anodes and cathodes, as well as solid electrolytes.

Another application for SCMs are resonators for frequency selective surfaces composed of nanostructured, micro-structured or meso-structured materials. The terms nanostructured, micro-structured, and meso-structured materials, as used herein, are materials with physical features (e.g., pores, precipitates, particles, and fibers) with average sizes in the 1-10 nm range in the case of nanostructured materials, 100 nm to 10 micron range in the case of micro-structured materials, and with a wide distribution of sizes in the case of mesoporous materials. These resonators can be used for direct energy absorption, and to convey energy of only select frequencies, for example, in metamaterials for IoT devices and systems applications.

Another application for SCMs is in semiconductor devices. For example, an SCM can contain semiconducting particles (e.g., Si, SiGe, or GaAs) coated with a matrix material (e.g., conductive carbon, or an insulating oxide). By tuning the morphology and materials in the SCMs, the properties of the semiconducting SCM can be tuned (e.g., the optical absorption, or the carrier mobility). These properties can be tuned to produce materials for high quantum efficiency photodetectors, or high mobility thin film transistors.

A structural application for the SCMs described herein are reinforcing fillers for elastomer compounds. There are three properties that affect the ability of a particular carbon material to reinforce elastomers: surface area, structure, and surface activity. The present SCMs can be tailored to produce elastomer compounds with different properties. For example, high surface area graphene-containing porous media can be functionalized with an active material (e.g., H, S or N containing species) to improve the surface interaction between the SCM filler material and the surrounding polymer. Elastomeric compounds that incorporate functionalized carbon materials described herein can also benefit from a faster rate of cure, improved elastic moduli, improved abrasion resistance, and/or improved electrical conductivity.

Some non-limiting examples of active materials for the present SCMs are sulfur, sulfur compounds, silicon, silicon compounds, boron, bromine, and platinum, nickel, silver, molybdenum, and iron, however, the materials and methods described herein are applicable to many different active materials.

Throughout this disclosure, the SCMs are often described in the context of battery applications (e.g., in anodes or cathodes using silicon or sulfur active materials), however, the examples above illustrate that the materials and methods described herein are applicable to many different applications.

In some embodiments, an SCM contains porous media coated with ECM and has high surface area and very small pores. Conventionally, it can be difficult to deposit an additional material (e.g., an active material) into very small pores, especially if those pores have high aspect ratios. In some embodiments, the surface characteristics of the partially formed SCM and the deposition method of the additional material enable the additional material to efficiently be deposited within the small pores of the SCM, even into pores with high aspect ratios. For example, the average pore size can be less than 50 nm or less than 10 nm or less than 5 nm, with an aspect ratio of 1:10 (i.e., 10 times deeper than wide), or 1:5, or 1:2, or 1:1, and the additional material can fill more than 30%, or more than 40%, or more than 50%, or more than 60%, or more than 70%, or more than 80%, or more than 90% of the volume of the pore. In the case of a thin coating, then for the same pore sizes as above, the additional material coating can cover more than 30%, or more than 40%, or more than 50%, or more than 60%, or more than 70%, or more than 80%, or more than 90% of the surface area of the pore with the geometries described above.

In some embodiments, an initial coating of surfactant materials, such as silver, or antimony) are grown on the aforementioned materials to promote the additional material to fill the pores (e.g., with the geometries described above) without clogging. Tuning these surfactant materials (e.g., by varying coverage) can also be used to effectively tune the degree of pore volume filling of an additional material. In other examples, a thin wetting layer, such as a layer of amorphous carbon, or a surface functionalized with hydroxy groups, allows the additional material (especially if the additional material is a liquid) to more effectively infiltrate into the small pores.

In some embodiments, the porous media, conductive particles, and/or ECM can have a high surface area (e.g., greater than 50 $m^2/g$), a high electrical conductivity (e.g., greater than 500 S/m), and/or a particular morphological structure (e.g., a mesoporous structure with a bi-modal pore size distribution, or with nanometer-scale pores interspersed within a 3D web of thicker more conductive branches). These properties can also be varied such that the SCMs are useful in different applications.

In some embodiments, the porous media, conductive particles, and/or ECM have a surface area, when measured using the Brunauer-Emmett-Teller (BET) method with nitrogen as the adsorbate (i.e., the "BET method using nitrogen", or the "nitrogen BET method") or the Density Functional Theory (DFT) method, that is from 50 to 300 $m^2/g$, or from 100 to 300 $m^2/g$, or from 50 to 200 $m^2/g$, or from 50 to 150 $m^2/g$, or from 60 to 110 $m^2/g$, or from 50 to 100 $m^2/g$, or from 70 to 100 $m^2/g$.

In some embodiments, the porous media, conductive particles, and/or ECM have pore volumes greater than 0.1 $cm^3/g$, or greater than 0.5 $cm^3/g$, or from 0.1 $cm^3/g$ to 0.9 $cm^3/g$, or from 0.2 to 10 $cm^3/g$. The porous media, conductive particles, and/or ECM can contain pores with average pore diameters from 1 to 4.3 nm and pore volume per gram of 0.46 $cm^3/g$, or average pore diameter of 8.3 nm and pore volume per gram of 0.31 $cm^3/g$. In some embodiments, the porous media, conductive particles, and/or ECM can contain mixtures of microporous, mesoporous, or macro-porous materials with pore diameters from 1 nm to 10 nm, of from 1 nm to 50 nm, and pore volumes from 0.1 $cm^3/g$ to 1 $cm^3/g$, or from 0.2 $cm^3/g$ to 10 $cm^3/g$.

In some embodiments, the porous media and/or conductive particles are particles with approximate particle size (e.g., diameter in the case of spherical particles) less than 10 microns, or less than 1 micron, or less than 100 nm, or from 10 nm to 10 microns, or from 10 nm to 1 micron.

In some embodiments, the porous media, conductive particles and/or ECM have an electrical conductivity (e.g., when compressed into a pellet) greater than 500 S/m, or greater than 2000 S/m, or from 500 S/m to 5000 S/m, or from 500 S/m to 20,000 S/m. In some embodiments the porous media, conductive particles and/or ECM have an electrical sheet resistance less than 1 ohm/square, or less than 100 Ohm/square, or between 1 Ohm/square and 100 Ohm/square, or between 1 Ohm/square and 10,000 Ohm/square, or between 1 Ohm/square and 100,000 Ohm/square. In some cases, the electrical conductivity of the porous media, conductive particles and/or ECM is measured after compression (e.g., into a disk, pellet, etc.), or after compression followed by annealing. In some cases, the sheet resistance of the porous media, conductive particles and/or ECM have is measured by forming a film (e.g., by formulating particles into a slurry with a volatile solvent, coating, and drying), and using a four-point probe measurement, or an eddy current based measurement.

In different applications, the porous media can be electrically conductive, electrically insulating, or a semiconductor. A few non-limiting examples of porous media materials are carbon allotropes, silicon, silicon oxide, silica, diatomaceous earth, and silicon carbide; however, the materials and methods described herein are applicable to many different porous media materials. Throughout this disclosure, the porous media, conductive particles and/or ECM may be described as being composed of carbon allotropes, or carbon alloys, semiconductors, pure metals, or silicon, however, the materials and methods described herein are applicable to many different materials. For example, SCMs containing covetic materials (i.e., aluminum or copper intermixed with carbon) can be produced using plasma torch processing. The co-deposition within the plasma torch enables the formation of covetic materials, which are useful as interfacial materials in batteries, for example, to enhance battery electrode to substrate adhesion.

In some embodiments, the porous media is composed of inorganic materials that are capable of withstanding high processing temperatures that are required for the downstream processes (e.g., greater than 500° C., or greater than 1000° C.). In other embodiments, the porous media is composed of materials with melting points and/or boiling points below the processing temperatures that are required for the downstream processes (e.g., greater than 500° C., or greater than 1000° C.). In some of these cases, the porous media will change phase in the downstream processes and intermix (e.g., melt-diffuse) with subsequently deposited materials.

In some embodiments, the ECM can be deposited on the porous media, and the porous media will change phase during the ECM deposition process. In some cases, the electrically conductive media and the porous media will intermix (e.g., melt-diffuse) during the ECM deposition process. In some cases, covetic materials can result from phase changes through the SCM production process, which allow the two components to effectively combine.

FIG. 1 illustrates a process 100 for producing SCMs, in some embodiments. A porous media is provided, as shown in step 110. For example, the porous media can be provided, as in step 110, with a larger diameter (e.g., 10 microns, or 1 micron), and be broken during formation of the SCM such that the porous media particle size is smaller (e.g., less than 1 micron, or less than 100 nm) in the formed SCM. The scanning electron microscope (SEM) image 115 shows an example of a silicon-based porous media that can be used in step 110.

The porous media in step 110 and image 115 in FIG. 1 are illustrated as approximately star-shaped, however, this is only a non-limiting example. Different morphologies of the porous media can be advantageous for different applications. For example, carbon-based mesoporous structures (e.g., with bi-modal or multi-modal pore size distributions) can be advantageous in battery electrodes, metamaterials for IoT, fillers for elastomeric compounds, or other applications. The porous media can be any shape that provides a high porosity, such as mesoporous structures, hierarchical structures (i.e., structures with small and large features organized by size, such as dendritic or fractal-like structures), star-shaped, fibrous, or ordered structures.

An ECM, as described above, can then be conformally deposited (e.g., coated, as stated in the figure) on the surfaces and/or within the pores of the porous media, as shown in step 120. In some embodiments, the SCMs containing the porous media and the ECM, as described above, have an electrical conductivity greater than 500 S/m, or greater than 2000 S/m, or from 500 S/m to 5000 S/m, or from 500 S/m to 20,000 S/m. In some cases, the electrical conductivity of the SCMs is measured after compression (e.g., into a disk, pellet, etc.), or after compression followed by annealing. In some embodiments, the SCMs containing the porous media and the ECM, as described above, have an electrical sheet resistance less than 1 ohm/square, or less than 100 Ohm/square, or between 1 Ohm/square and 100 Ohm/square, or between 1 Ohm/square and 10,000 Ohm/square, or between 1 Ohm/square and 100,000 Ohm/square. In some cases, the sheet resistance of the SCMs is measured by forming a film (e.g., when the SCMs are formulated into a slurry with a volatile solvent, coated, and dried), and using a four-point probe measurement, or an eddy current based measurement.

For example, SCMs with high electrical conductivity can be created by vapor depositing metals onto the clusters in such a way as to prevent pore clogging (e.g., by functionalizing the pore surfaces as described above). In some applications, these high-conductivity SCMs are slurry deposited (i.e., as inks or toners for printers). Optionally, a heated calendaring roller can compress and melt the metals in the SCM particles together to connect the porous media (e.g., graphene containing carbon material) without the use of binders. In some high-speed electronics applications, films or patterns formed using this method can be used to efficiently conduct GHz frequency electrical signals. In the case of toners, SCM particles can be printed via laser printer and microwave radiation can be used to melt a low melting point ECM (e.g., silver, or antimony), thereby embedding the porous media of the SCM particles in a highly conductive metal matrix.

The thickness of the ECM deposited on the surfaces and/or within the pores of the porous media, as shown in step 120, can be from 1 monolayer (e.g., less than 1 nm thick) to several layers thick (e.g., less than a few nanometers thick). In other cases, the thickness of the ECM deposited on the surfaces or within the pores of the porous media can be from 1 nm to 100 nm thick, or from 0.1 microns to 100 microns.

In some cases, after step 110, the porous media can be pre-treated before step 120 coating with the ECM. Some examples of pre-treatments are chemical etches, plasma etches, mechanical size reduction, or combinations of chemical and mechanical processes. Some non-limiting examples of pre-treatments include mechanical processing, such as ball milling, grinding, attrition milling, microfluidizing, jet milling, and other techniques to reduce the particle size without damaging the carbon allotropes contained within. Other examples of pre-treatments include exfoliation processes such as shear mixing, chemical etching, oxidizing (e.g., Hummer method), thermal annealing, doping by adding elements during annealing (e.g., S, and N), steaming, filtering, and lypolizing, among others. Other examples of pre-treatments include sintering processes such as SPS (Spark Plasma Sintering, i.e., Direct Current Sintering), microwave, microwave plasma, and UV (ultraviolet), which can be conducted at high pressure and temperature in an inert gas. In some embodiments, multiple pre-treatment methods can be used together or in series. These pre-treatments can be useful to modify the morphologies and/or surfaces of the porous media before ECM growth. For example, pre-treatments can change the surface energy of the porous media so the ECM can more effectively penetrate into the small pores of the porous media.

An active material, as described above, can then be deposited on the surfaces and/or within the pores of the porous media optionally coated with the ECM, as shown in step 130. The resulting material is an SCM with a porous media, optionally an ECM, and an active material. The active material can be deposited using any conformal deposition technique capable of depositing the active material on the surfaces and/or within the pores of the porous media optionally coated with the ECM. Some examples of conformal deposition techniques that can be used to deposit the active material are solution deposition techniques (e.g., chemical bath deposition, sol-gel deposition, particle printing, etc.) and vapor deposition techniques (e.g., sputtering, evaporation, chemical vapor deposition, atomic layer deposition (ALD), etc.).

Due to the high porosity of the porous media and/or the ECM, an active material that efficiently penetrates into the pores can occupy a large volume of the SCM. In some embodiments, the mass fraction of the active material compared to the total mass of the SCM is greater than 20%, or greater than 40%, or greater than 60%, or greater than 80%, or from 10% to 90%, or from 50% to 90%, or from 60% to 90%.

In some cases, the active material will alloy with the material in the porous media or the materials in the porous media coated with the ECM. For example, in some processes the active material is deposited at an elevated temperature, which can melt or partially melt the porous media and/or conductive particles and the active material will alloy with the underlying materials upon deposition. In other cases, the porous media and/or conductive particles will not melt or will partially melt during the active material deposition, but the elevated temperatures enable the active material to diffuse into the underlying materials causing some degree of alloying between the active materials and underlying materials.

In some embodiments, coating the porous media with other films (i.e., an ECM and/or active material) will densify the porous media by filling in some of the voids (i.e., pores) in the material. The same is true for other examples of film deposition on the porous materials described herein. Furthermore, the act of welding (or coalescing) can also densify the less dense porous materials into a denser SCM.

In some embodiments, the porous media, as shown in step 110 in FIG. 1, has a high electrical conductivity (e.g., a conductive carbon allotrope), as described above. In such cases, the coating of additional ECMs (e.g., in step 120) may or may not be required.

In some embodiments, the porous media, as shown in step 110 in FIG. 1, is itself an active material (e.g., silicon), as described above. In such cases, the coating of additional active materials (e.g., in step 130) may or may not be required.

One or more post-processing steps can be performed on the SCM, as shown in step 140. For example, etching (e.g., plasma etching, or chemical etching) can be performed on the SCM to selectively etch or remove one or more of the material components. Some non-limiting examples of post-treatments include mechanical processing, such as ball milling, grinding, attrition milling, micro-fluidizing, jet milling, and other techniques to reduce the particle size without damaging the carbon allotropes contained within. Other examples of post-treatments include exfoliation processes such as shear mixing, chemical etching, oxidizing (e.g., Hummer method), thermal annealing, sintering, doping by adding elements during annealing (e.g., S, and N), steaming, filtering, and lypolizing, among others. Other examples of post-treatments include sintering processes such as SPS, microwave, microwave plasma, and UV, which can be conducted at high pressure and temperature in an inert gas. In some embodiments, multiple post-treatments methods can be used together or in series. The post-processing can be useful to modify the morphology and/or the surfaces of the SCMs. For example, large SCMs can be ground into smaller SCMs and formulated with certain solvents into printable inks.

Using the process 100 in FIG. 1, the active material can be dispersed through the SCMs such that the active material both has a high surface area, and is also supported by a porous structure with very high electrical conductivity.

Figure 2A:
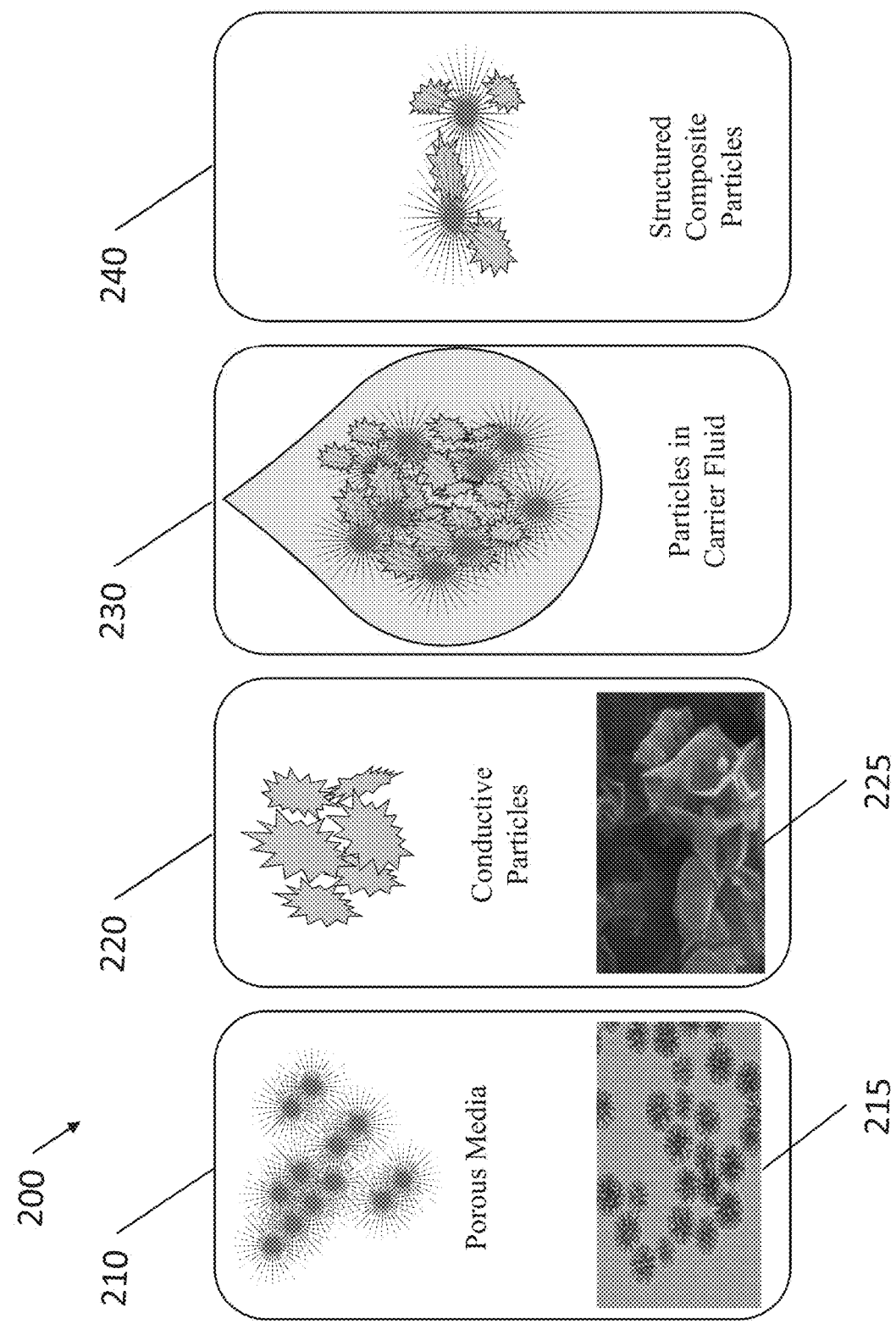
FIG. 2A illustrates a process for forming an SCM from porous media, electrically conductive particles and a carrier fluid, in accordance with some embodiments.

FIG. 2A illustrates a process 200 for producing SCMs using a carrier fluid, in accordance with some embodiments. Similar to the process 100 in FIG. 1, in this process 200 a porous media is provided, as shown in step 210. The porous media shown in step 210 is similar to the porous media as described in step 110 in FIG. 1. The SEM image 215 shows an example of a silicon-based porous media that can be used in step 210.

The process 200 shown in FIG. 2A differs from the process 100 in FIG. 1 by including conductive particles, as shown in step 220, in addition to the porous media shown in step 210. The conductive particles in step 220 can be carbon-based particles, metallic particles, or conductive oxides. In some cases, these conductive particles also are able to withstand the high processing temperatures that are required for the downstream processes (e.g., greater than 1000° C.). The SEM image 225 shows an example of carbon-based (graphene in this example) particles that can be used in step 220.

The porous media described in step 210 and/or the conductive particles described in step 220 can then be mixed together in a carrier fluid to form a carrier fluid mixture, as shown in step 230. In some embodiments, the carrier fluid is a precursor that is used in a molecular dissociation reaction to "weld" (i.e., coalesce, or unite the physically separate particles into one composite material) the porous media and the conductive particles into an SCM. For example, the carrier fluid (optionally mixed with another precursor input material) can dissociate (or decompose) into separated components and form an ECM that coats the porous media and conductive particles thereby welding them together. For example, the carrier fluid can contain carbon (e.g., methane gas), and can dissociate into a carbon-based ECM (e.g., graphene-containing particles) and volatile byproducts (e.g., hydrogen). The carrier fluid can be inert (e.g., used mainly to transport the particles within the reactor), be reactive (e.g., be separated into components that form the materials deposited in the reactor, e.g., the ECM), or be used to form a plasma (e.g., a hydrogen plasma within a microwave plasma reactor). In different embodiments, the carrier fluid can be a liquid, a gas or a mixture of liquid and gas.

Some examples of gaseous carrier fluids that contain carbon are hydrocarbon gases, such as $C_2H_2$, $C_2H_4$, $C_2H_6$, $C_3H_6$, carbon dioxide with water, trimethylaluminum (TMA), trimethylgallium (TMG), glycidyl methacrylate (GMA), methylacetylene-propadiene, propadiene, propane, propyne, acetylene, and any mixture or combination thereof. Some examples of liquid carrier fluids that contain carbon are isopropyl alcohol (IPA), ethanol, methanol, acetone, condensed hydrocarbons (e.g., hexane), other liquid hydrocarbons, and any mixture or combination thereof. In some embodiments, the carrier fluid can be a mixture of any of the liquids above with any of the gases above. In some embodiments, the carrier fluid contains carbon and contains less than 1% oxygen, or contains no oxygen.

In some embodiments, the fraction of carrier fluid to solids (i.e., porous media and/or the conductive particles) in the carrier fluid mixture in step 230 is from 5:1 to 1000:1. In some cases, oversaturated carrier liquid mixtures may be used, where the solids can be agitated to keep the solids in suspension.

The mixture of the porous media and/or the conductive particles in the carrier fluid is then fed into a reactor to create the SCMs described herein, as shown in step 240. In step 240 the porous media and conductive particles are welded together to form an SCM. The porous media and conductive particles can be welded together by depositing an additional material (e.g., an ECM, a metal, or an oxide) that coats the porous media and conductive particles thereby welding them together. In some embodiments, the decomposition of the carrier fluid supplies the additional material (e.g., an ECM such as a carbon-containing material) that become incorporated into the SCM in step 240. For example, in some cases the initial step within a reactor performing the step 240 is the nucleation of the conductive separated components from carrier fluids onto the surfaces of the porous media and/or the conductive particles, and after nucleating on the surfaces, the conductive separated components forming the ECM described above grow thicker and weld the porous media and/or the conductive particles together. In other cases, the porous media and conductive particles are completely or partially melted and weld (or coalesce) together without the deposition of another material. The porous media and/or the conductive particles can be melted for instance by applying microwave energy, or thermal energy, or through the use of a plasma. The porous media and/or the conductive particles can also be partially welded together in step 240, and further welding can occur in one or more downstream processes.

In some embodiments of step 240, an ECM can be deposited on the surfaces and/or within the pores of the porous media and/or the conductive particles, and the porous media and/or the conductive particles can be welded together. The result is an SCM with a continuous ECM (i.e., a conductive matrix) connecting and surrounding the porous media and/or the conductive particles. For example, the carrier fluid can be decomposed into separated components, where one of the separated components is the ECM.

The reactions described in process 100 (e.g., in steps 120 or 130) and process 200 (e.g., in step 240) can occur in different types of reactors. The term "reactor" as used herein can include any system where the porous media and/or the conductive particles and/or the active materials are processed to form the SCMs described herein, or to form an intermediate product of the SCMs described herein. The reactors described herein will typically provide energy to input materials to deposit materials, weld materials together, or otherwise alter the input materials, thereby forming the SCMs described herein. For example, the input materials can be a gas or liquid input material that is converted into separated components to form particles or deposit films, or the porous media which are partially melted and weld together with conductive particles. In some cases, the reactors can include enclosed chambers, or chambers that are open to the surrounding environment. In some cases, the reactors can enable processing at atmospheric pressure, or a pressure greater than 0.1 atm, or in a vacuum. The pressure within the reactor can be above atmospheric pressure (e.g., above, 1 atm, or from 1 atm to 10 atm), approximately at atmospheric pressure (e.g., from 0.5 atm to 2 atm, or from 0.1 atm to 2 atm), or a vacuum (e.g., below 0.1 atm). In some cases, the atmosphere within the reactor is inert (e.g., argon or nitrogen gas), or reactive (e.g., oxygen or hydrogen gas), or moderately reactive (e.g., air). In some cases, the reactor is a microwave plasma reactor, a microwave plasma enhanced chemical vapor deposition (CVD) reactor, a microwave thermal CVD reactor, a plasma torch, a radio frequency (RF) energy source reactor, an RF plasma CVD reactor, a thermal reactor, a filament heating thermal CVD reactor, a thermal CVD reactor, an inductive heating thermal CVD reactor, a particle drum coater, or a UV reactor. A particle drum coater is a reactor that processes particles inside of a rotating drum (e.g., to deposit additional materials on the particles, or modify the particle surfaces). A UV reactor is a reactor that supplies energy to the materials using UV radiation.

The processes described herein (e.g., process 100 in FIG. 1, and process 200 in FIG. 2A) contain a sequence of steps, and in a given step one or more materials can be produced, modified, or welded. In some embodiments, all of the steps in a reaction occur in one integrated reactor (i.e., "in situ" processing), while in other embodiments, separate reactors are used for different steps (i.e., "ex situ" processing). For example, the porous media and/or conductive particles can be produced ex situ in separate reactors, collected from each reactor, and then fed into a third reactor to be welded together. In another example, the porous media and/or conductive particles can be produced in situ in separate zones of the same reactor, and then fed into a third zone of the reactor to be welded together.

In some embodiments, the carrier fluid mixed with the porous media and/or the conductive particles is combined with another liquid or gaseous supply material within a reactor. This supply material can be inert (e.g., used mainly to transport the particles within the reactor), be reactive (e.g., be separated into components that form the materials deposited in the reactor, e.g., the ECM), or be used to form a plasma (e.g., a hydrogen plasma within a microwave plasma reactor). Some supply materials contain carbon, and some do not. Some examples of gaseous supply materials that contain carbon are hydrocarbon gases, such as $C_2H_2$, $C_2H_4$, $C_2H_6$, carbon dioxide with water, TMA, TMG, GMA, methylacetylene-propadiene, propadiene, propane, propyne, acetylene, and any mixture or combination thereof. Some examples of liquid supply materials that contain carbon are IPA, ethanol, methanol, condensed hydrocarbons (e.g., hexane), other liquid hydrocarbons, and any mixture or combination thereof. Some examples of gaseous supply materials that do not contain carbon are hydrogen, helium, a noble gas such as argon, or mixtures of more than one type of gas. An example of a liquid supply material that does not contain carbon is LiS. Depending on the composition of the carrier gas, and optional other gases, in different embodiments, the fraction of carrier fluid to total flow into the reactor can vary widely (e.g., from 0.1% to 100% of the total flow).

Figure 2B:
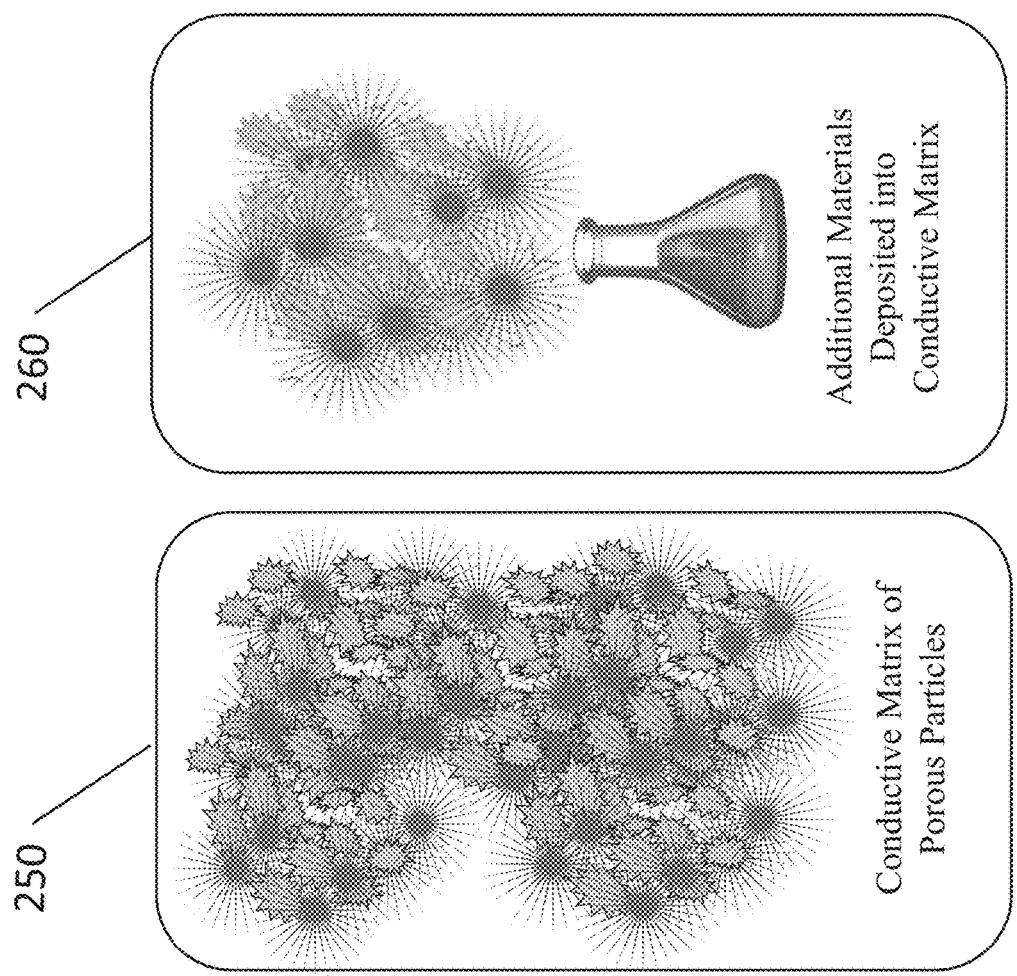
FIG. 2B illustrates a process for depositing an active material in the SCM material depicted in FIG. 2A.

In some embodiments, after the SCM is created in step 240 in FIG. 2A, an active material is deposited on the surfaces of and/or within the pores of the SCM. FIG. 2B illustrates a process for producing SCMs, in some embodiments, where additional materials are incorporated into the first SCM produced in step 240 to form a second SCM including an active material. For example, a first SCM with a continuous ECM (i.e., a conductive matrix) connecting and surrounding porous media and/or conductive particles is provided in step 250. The SCM shown in step 250 is a non-limiting example of an SCM as described in step 240 in FIG. 2A. Other embodiments include SCMs produced in step 240 with porous media and conductive particles that are welded together in other ways, such as using a non-conductive material, or by melting the particles as described above. Continuing with the example process described in FIG. 2B, the active material is then deposited on the surfaces and within the pores of the first SCM, as shown in step 260. The resulting material in this example is a second SCM containing an ECM and an active material. The active material can be deposited using any conformal deposition technique, as described in step 130 of FIG. 1 above. In this example, or other examples where the first SCM is welded together differently, the active material can be any of the active materials described above (e.g., an energy storage material such as S or Si, a semiconductor material, or a surface functionalization material).

Different methods can be used to feed the carrier fluid mixtures into the reactors. In some experimental runs representative of various embodiments, carrier fluid mixtures were supplied to the reactor using gas lines, atomizers, or bubblers (e.g., head gas fed into reactor with/without an additional carrier gas). In some cases, the carrier fluid mixtures were supplied in the reactor from single source or multi-source supply methods. In some cases, the carrier fluid and porous media and/or the conductive particles were mixed in situ in the reaction chamber, or prior to being fed into the reactor. In some cases, the carrier fluid and porous media and/or the conductive particles were fed directly into the reactor from a single stream, and in other cases there were multiple feed streams into the reactor and mixing occurred within the reactor. In some cases, the materials being fed into the reactor are temperature regulated. For example, the temperature of a gaseous material can be kept above the boiling point of the liquid phase (e.g., 10° C. above the boiling point).

In some cases, the carrier fluid with the porous media and/or the conductive particles is fed into a reactor (e.g., a microwave plasma reactor) to produce an SCM, which is subsequently compressed into a pellet or deposited onto a substrate to form a film, and the resistance or sheet resistance of the resulting SCM pellet or film is low (i.e., the conductivity is high). For example, in experimental runs, carbon particles and silver particles were combined and fed into a microwave reactor to create an SCM (similar to what is described in step 240 in FIG. 2A). The amounts of microwave power were varied in different experiments. The resulting SCMs had resistivities 20-35% lower than the resistivity of the carbon particles alone (when compressed into a pellet for testing).

In some cases, the carrier fluid with the porous media and/or the conductive particles is processed in a UV reactor, and irradiated with a UV laser to form the SCM. For example, in experimental runs, carbon particles were fed into a reactor and irradiated with a UV laser to create an SCM (similar to what is described in step 240 in FIG. 2A). In some of the experimental runs, the pressure within the UV reactor was a low pressure (e.g., from 1 mTorr to 500 mTorr, or below about 70 Torr). In other embodiments, other pressures can be used within the reactor, such as above atmospheric pressure (e.g., above, 1 atm, or from 1 atm to 10 atm), approximately at atmospheric pressure (e.g., from 0.5 atm to 2 atm, or from 0.1 atm to 2 atm). In some experimental runs, the environment within the reactor was inert. In some experimental runs, a KOH chemical pre-treatment was performed on the carbon particles prior to UV irradiation, and in some cases no chemical pre-treatment was performed. In some cases, the resulting SCMs had sheet resistivities about 80% lower than the sheet resistivity of the carbon particles alone (when compressed into a pellet for testing).

In some embodiments, the porous media (e.g., as shown in 210 in FIG. 2A) and/or the conductive particles (e.g., as shown in 220 in FIG. 2A) are broken up within one or more process steps described herein (e.g., in process 100 in FIG. 1, or process 200 in FIG. 2A). In some cases, energy supplied by the reactor during processing (e.g., during subsequent materials deposition, in step 120 or 130 in FIG. 1, or in step 240 in FIG. 2A) can cause the porous media particles and/or conductive particles to fracture, such that the average diameter of the particles is reduced. In some cases, the breaking up of the porous media particles and/or conductive particles occurs in a single step, or in multiple steps within the reactor. For example, the mixture of the porous media and/or the conductive particles in the carrier fluid can be fed into a reactor, and the porous media particles can be broken up (i.e., the average diameter of the particles reduced) during the formation of the SCMs in step 240 in FIG. 2A. In other words, the breaking of the porous media and the deposition of the ECM can occur within the same zone of a reactor. In another example, the processes including the deposition of the ECM onto the porous media in step 120 in FIG. 1, the breaking of the porous media, and the joining or fusing of the porous media aided by the ECM deposition, can occur concurrently. In other embodiments, the porous media can be broken up in the reactor prior to the deposition of the ECM. For example, the porous media can be broken up in a first zone of a reactor, and the ECM deposition (e.g., as in step 120 in FIG. 1) can occur in a second zone within the reactor. In another example, the process, as shown in step 240 in FIG. 2A, can occur in a reactor with multiple zones, and the porous media can be fed into a first zone in the absence of the ECM deposition, and then the broken up particles can flow to a zone downstream where ECM is deposited on the broken up porous media particles. In other examples, the breaking up of the particles and the deposition of the ECM can occur sequentially in different zones within the same chamber of a reactor, or in different zones within different chambers of a single reactor. That is, the porous media can be fed into the reactor in the absence of the ECM, then the porous media are broken up, and then the ECM is deposited on the broken up porous media particles.

In some embodiments, SCMs are produced using the methods described above (e.g., process 100 in FIG. 1 or process 200 in FIG. 2A), and further include other types of particles mixed into the SCM. For example, the SCM shown in step 130 in FIG. 1 can include a second type of particle in addition to the porous media. In these embodiments, these other type of particles can be particles with properties other than those described for the porous media and/or conductive particles described herein. For example, they may have low surface areas (i.e., not be porous), they may be electrically insulating (i.e., not conductive), and/or they may not be active materials as described above. These additional particles can be included for various reasons. For example, the additional particles can have high aspect ratios (e.g., be fiber-like), which can improve the mechanical properties of the SCMs produced. In different embodiments, these additional particles can be added before or after the SCM constituent particles (e.g., the porous media particles) are broken up, and before or after a first SCM is formed (e.g., before or after the porous media particles and ECMs are joined (e.g., welded) together in step 240 in FIG. 2A).

All of the above examples that include breaking the porous media in the reactor can also include breaking the conductive particles in the same step or a subsequent step.

In some embodiments, the porous media particles and/or the conductive particles can be broken up within the reactor, either before, after or concurrently with the deposition of the ECM and the joining or fusing of the porous media, conductive particles and ECMs together. Some examples of methods for achieving this include the following non-limiting embodiments:

Example 1—The porous media particles, conductive particles and/or active material can be fed into the reactor, and a) the porous media particles, conductive particles and/or active material can be broken up, b) the ECMs can be deposited, and c) the porous media particles, conductive particles and/or active material can be joined or fused together to produce an SCM, where a), b) and c) all occur in one step in the reactor. In other words, in this example, in the step of coalescing (e.g., as shown in step 240 in FIG. 2A), the porous media and/or conductive particles are broken up and the ECMs are deposited in a microwave plasma reactor in a single step.

Example 2—Processes a), b) and c) as in non-limiting example 1 above can occur in a first step, and then a second step can include depositing the active materials on the joined or fused material to produce a second SCM, either i) within a separate zone of the reactor, or ii) ex situ after removing the joined or fused material from the reactor.

Example 3—In a first step, the active material can be fed into a reactor, and a) broken up, b) ECMs can be deposited on the active materials, and c) the active materials and the ECMs can be joined or fused together to produce a first SCM. Then in a second step, the joined or fused active materials and ECMs can be fed into a second zone of the reactor, along with porous media particles and/or conductive particles, and i) the porous media particles and/or conductive particles can be broken up, ii) additional ECMs can be deposited, and iii) the porous media particles and/or conductive particles and the previously joined or fused active materials can all be joined of fused together to produce a second SCM.

Example 4—In a first step, ECMs can be formed within a first zone of a reactor. Then these ECMs can be fed into a second zone of the reactor, along with the porous media particles, conductive particles and/or active material, and a) the ECMs, the porous media particles, conductive particles and/or active material can be broken up, b) the ECMs can be deposited, and c) the porous media particles, conductive particles and/or active material can be joined or fused together to produce an SCM in this second step.

Example 5—In a first step, a first composition of the porous media particles, conductive particles and/or active material can be fed into the reactor, and the porous media particles, conductive particles and/or active material can be broken up. In a second step, a second composition of the porous media particles, conductive particles and/or active material can be fed into a second zone of the reactor, and the porous media particles, conductive particles and/or active material can be broken up. Then in a third step, the product of the first step and the product of the second step can be fed into a third zone of the reactor, and, a) the ECMs can be deposited, and b) the product of the first step and the product of the second step can be joined or fused together to produce an SCM.

In some cases, the carrier fluid with the porous media and/or the conductive particles can be formed into an SCM that is a film (e.g., during step 240 in FIG. 2A). For example, the carrier fluid with the porous media and/or the conductive particles can be formulated into an ink including volatile components, the ink can be coated onto a substrate, the volatile components can be removed (e.g., the film can be dried in an annealing and/or vacuum process), and the resulting film can be processed in a reactor to form the SCM. In another example, the SCM particles shown in step 130 in FIG. 1 can be formed in a microwave plasma reactor, and after the SCMs in step 130 are formed, they enter a plasma jet (e.g., within a plasma torch zone of the reactor) where they are ionized, and the ionized SCMs impinge on a substrate, thereby forming a high quality film of the SCM particles.

Figure 3:
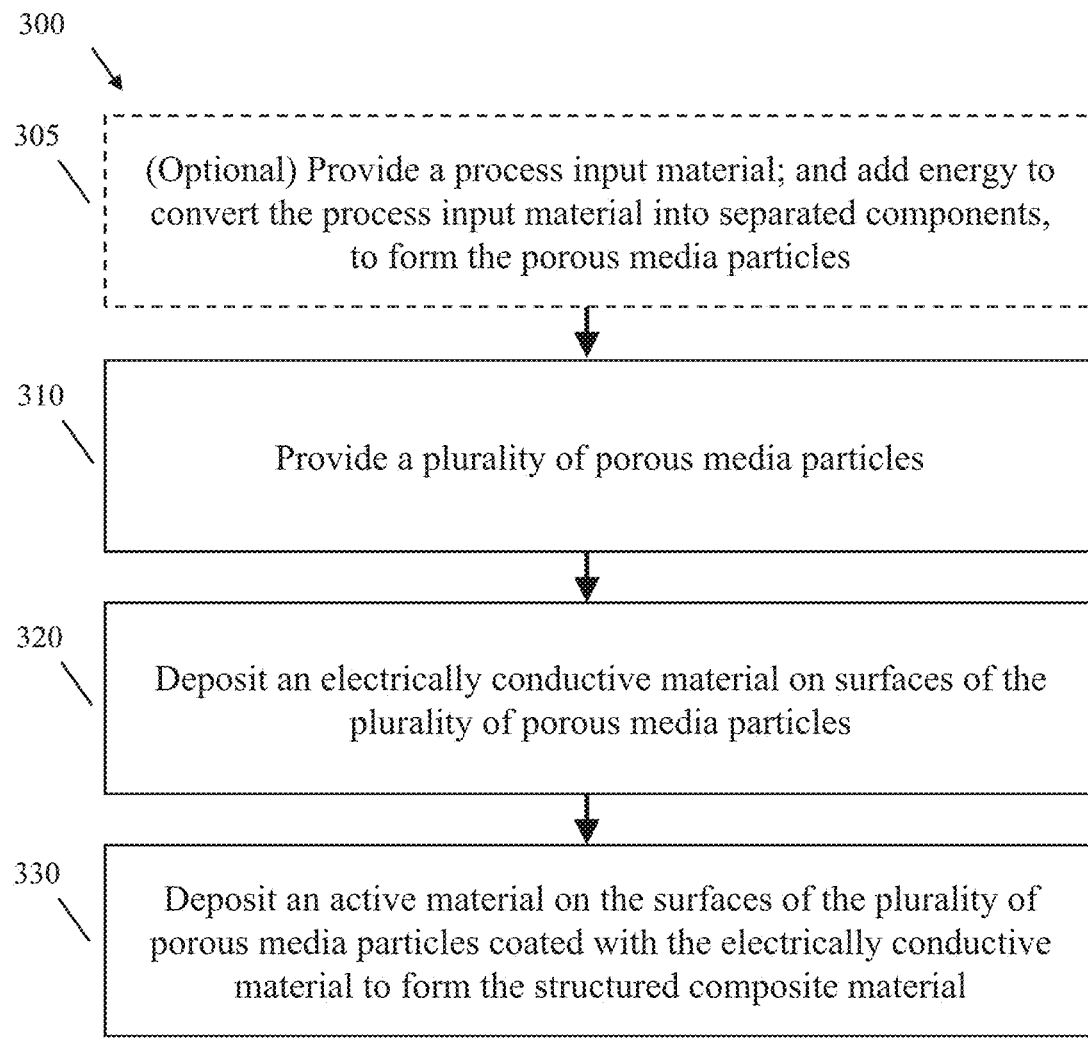
FIG. 3 is a process flow diagram for producing SCMs from porous media, an electrically conductive material (ECM), and an active material, in accordance with some embodiments.

FIG. 3 describes a non-limiting example of a method 300 to produce an SCM, in accordance with some embodiments. A plurality of porous media particles is provided in step 310, and an ECM is deposited on the surfaces (and/or in within the pores) of the porous media particles in step 320. An active material is then deposited on the surfaces (and/or in within the pores) of the plurality of porous media particles coated with the electrically conductive material to form the SCM in step 330.

Figure 4:
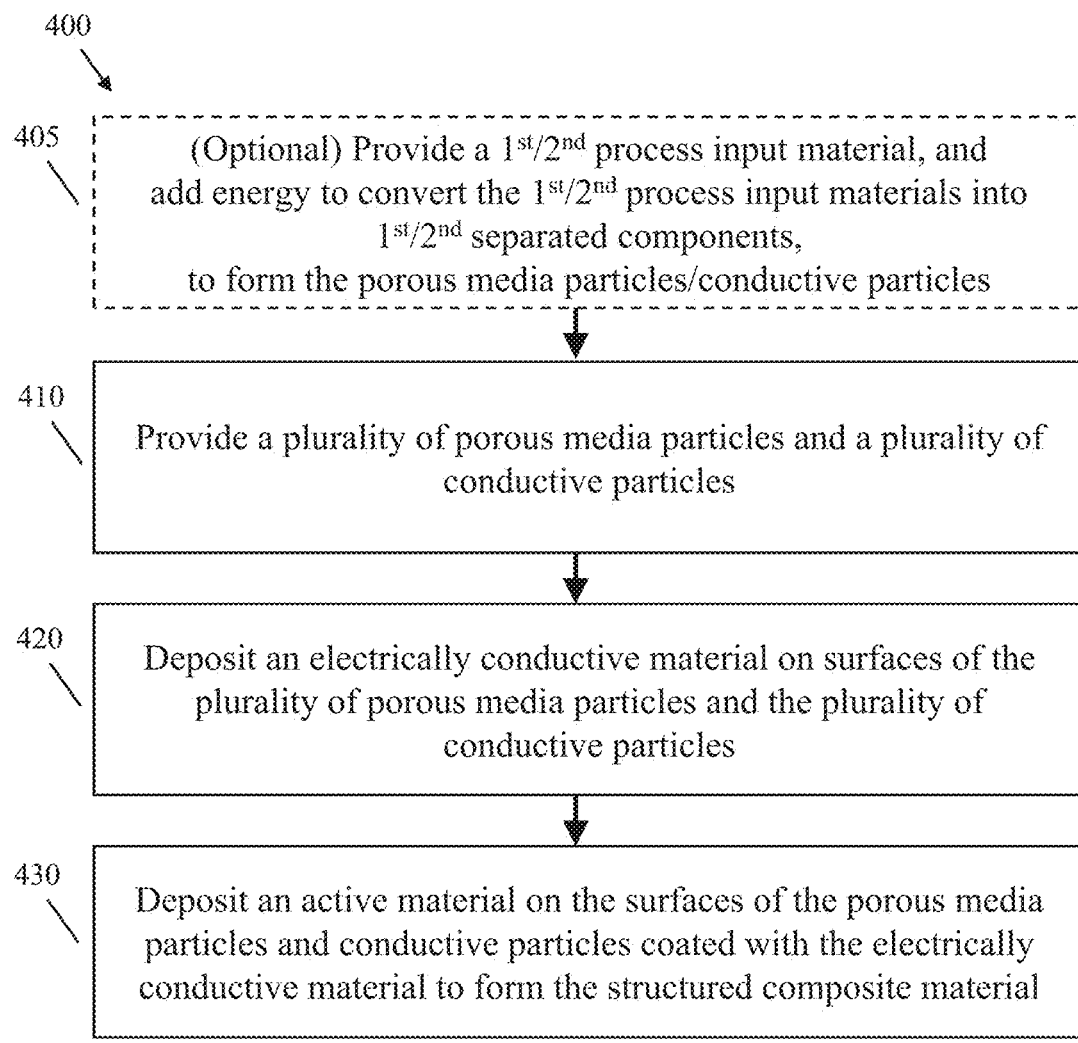
FIG. 4 is a process flow diagram for producing SCMs from porous media, conductive particles, an electrically conductive material (ECM), and an active material, in accordance with some embodiments.

FIG. 4 describes a non-limiting example of a method 400 to produce an SCM, in accordance with some embodiments. A plurality of porous media particles and a plurality of conductive particles are provided in step 410, and an ECM is deposited on the surfaces (and/or in within the pores) of these two types of particles in step 420. An active material is then deposited on the surfaces (and/or in within the pores) of the plurality of the porous media particles and the plurality of conductive particles coated with the electrically conductive material to form the SCM in step 430.

Figure 5:
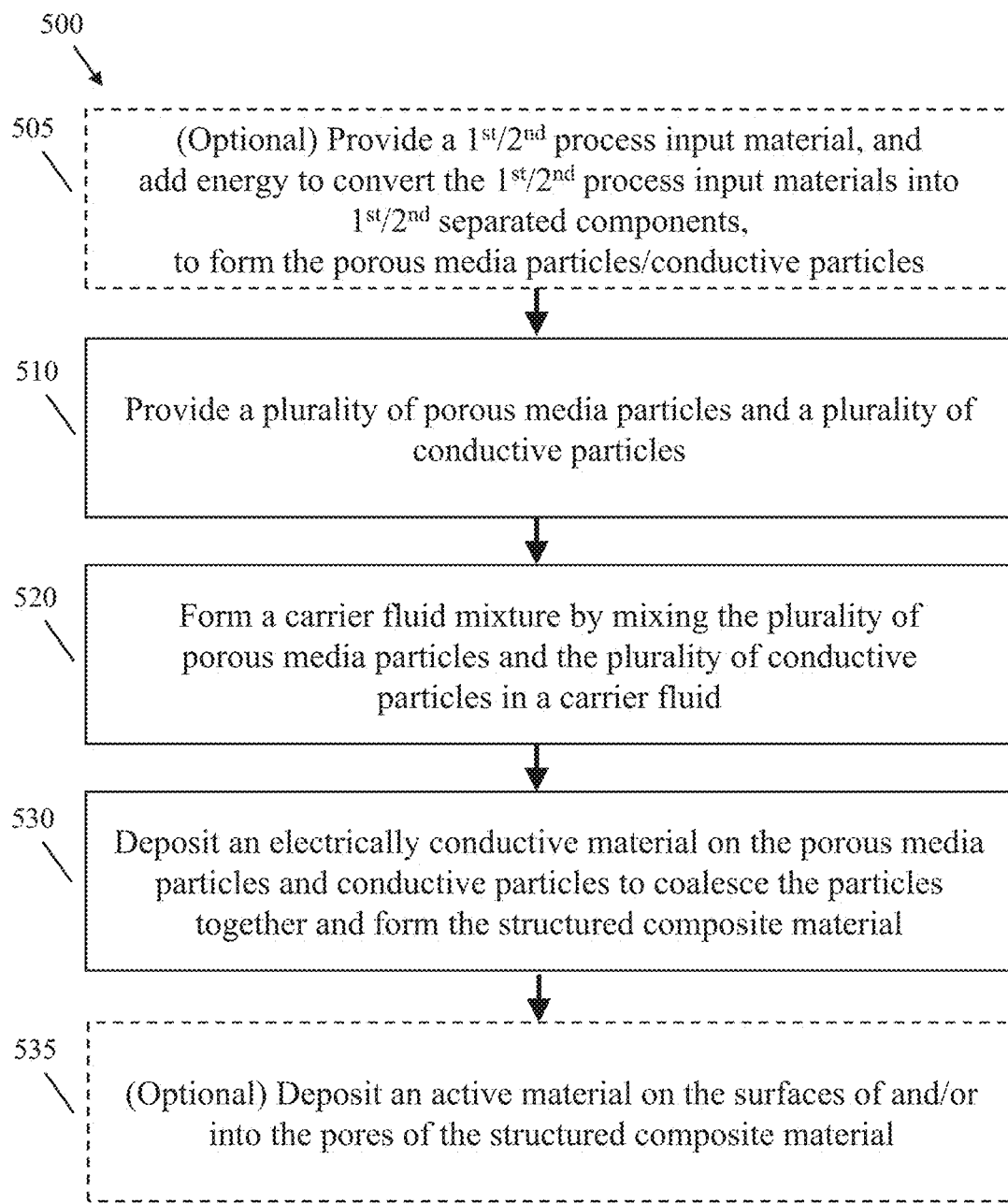
FIG. 5 is a process flow diagram for producing SCMs from porous media, electrically conductive particles and a carrier fluid, in accordance with some embodiments.

FIG. 5 describes a non-limiting example of a method 500 to produce an SCM, in accordance with some embodiments. A plurality of porous media particles and a plurality of conductive particles are provided in step 510. A carrier fluid mixture is formed by mixing the plurality of porous media particles and the plurality of conductive particles in a carrier fluid in step 520. An ECM is deposited on the surfaces (and/or in within the pores) of these two types of particles in step 530 to coalesce the particles together and form the SCM.

Optionally, in methods 300, 400 and 500, particles containing active materials can also be provided (e.g., in steps 310, 410 and/or 510) and are incorporated into the produced SCMs. For example, the porous media particles in step 310 can contain active materials (e.g., as the bulk material, alloys, or dopants), and the produced SCM in step 330 will contain the active materials. In other cases, mixtures of particles can be provided in the aforementioned methods, such as a mixture of porous media and particles containing active materials, or a mixture of porous media, conductive particles, and particles containing active materials, or a mixture of porous media, conductive particles and other types of particles (e.g., high aspect ratio particles).

Additionally, in methods 300, 400 and 500, the porous media, conductive particles, and/or active materials particles can be broken up, in accordance with some embodiments. As described elsewhere in this disclosure, the breaking of the particles can occur at any step, either before, after, or during the deposition of the ECM and/or active material.

The deposition of the ECM and/or the active material in methods 300, 400 and 500 can occur in separate reactors, or in different zones of a single reactor. In some cases, the different zones of the single reactor are within one chamber or are in different chambers within the reactor.

Additionally, the plurality of porous media particles and conductive particles can either be produced in one or more separate reactors from the reactor(s) used to deposit the ECM and active material, or in different zones of the same reactor used to deposit the ECM and active material.

For example, in step 305 of FIG. 3 a process input material can be provided (e.g., into a separate reactor, or a different zone of the same reactor used to deposit the ECM and active material), and energy can be added to convert the process input material into separated components, to form the porous media particles in step 305. In cases where these produced porous media particles are produced in separate zones of the same reactor used to deposit the ECM and/or active material, the produced porous media particles in step 305 can exit a first zone and enter a second zone where the ECM can be deposited in step 320.

In a second example, in step 405 of FIG. 4 a first and second process input material can be provided, and energy can be added to convert the process input materials into separated components, to form the porous media particles and conductive particles in step 405. In cases where the produced porous media particles are produced in separate zones of the same reactor used to deposit the ECM and/or active material, the produced porous media and conductive particles in step 405 can exit first and second zones and enter a third zone where the ECM can be deposited in step 420.

In a third example, in step 505 of FIG. 5 a first and second process input material can be provided, and energy can be added to convert the process input materials into separated components, to form the porous media particles and conductive particles in step 505. In cases where the produced porous media particles are produced in separate zones of the same reactor used to deposit the ECM material, the produced porous media and conductive particles in step 505 can exit first and second zones, be mixed with a carrier fluid to form a carrier fluid mixture, and the carrier fluid mixture can then enter a third zone where the ECM can be deposited in step 530.

Additional materials can also be deposited on the surfaces of and/or into the pores of the SCM after formation in step 540, in accordance with some embodiments. These additional materials can be the active materials described herein, as described in the process depicted in FIG. 2B. For example, mesoporous carbon porous media particles can be coalesced with metallic conductive particles (e.g., silver particles) using a graphene-containing ECM in a microwave plasma process in step 530, and then an active battery material (e.g., sulfur, or $Li_xS_y$) can be deposited into the pores using a physical vapor deposition process (e.g., evaporation). Such an SCM containing an active material would be advantageous for lithium ion battery cathodes.

Figure 6:
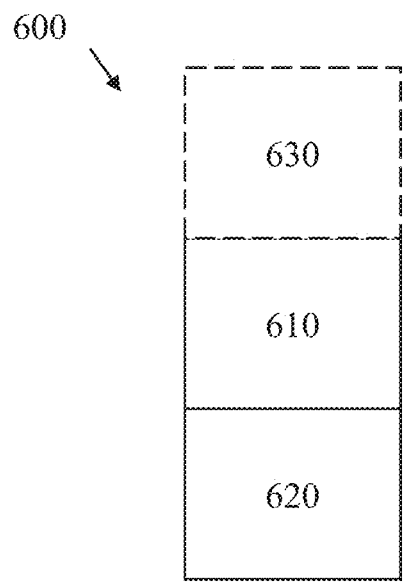
FIGS. 6 and 7 are schematics of reactors that can produce SCMs, in accordance with some embodiments.
Figure 7:
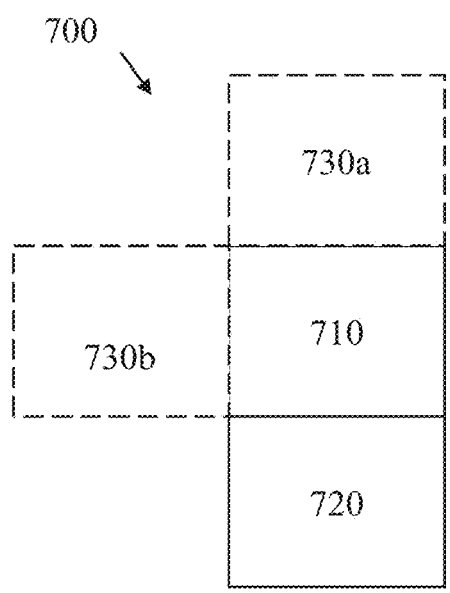

FIGS. 6 and 7 show some non-limiting examples of reactors that can produce the SCMs described herein.

The reactor 600 in FIG. 6 contains a set of zones 610, 620 and optionally 630. In some embodiments, porous media is fed into zone 610 where an ECM is deposited on the surfaces and/or within the pores of the porous media. Optionally, in zone 610, the porous media can also be broken up. The SCM is formed in zone 610 and then collected or deposited as a film directly from the reactor in zone 620. For example, the reactor can include a plasma torch that produces a plasma jet containing the produced SCM particles, and the plasma jet can transport the SCM particles to a substrate and deposit the SCM particles into a high quality film on the substrate.

In some cases, the reactor 600 also includes another zone 630, where the porous media are produced. In some cases, the zones 610 and 630 are separate chambers within the reactor, and the porous media is produced in a chamber (630) and exit the chamber 630 and enter the chamber 610 where the ECM is deposited. In other cases, the zones 610 and 630 are different zones within the same chamber of the reactor 600.

In one example, the reactor can include a zone with a microwave plasma (e.g., zone 630) where porous media are produced, a zone with a PVD deposition (e.g., a sputtering chamber, or a particle drum coater) (e.g., zone 610) where the porous media are coated with an ECM, and a zone with a plasma torch (e.g., zone 620) that produces a plasma jet containing the produced SCM particles, and the plasma jet can transport the SCM particles to a substrate and deposit the SCM particles into a high quality film on the substrate.

In some embodiments, one or more zones of the reactors described herein can contain a plasma torch. In some embodiments, a plasma torch comprises three zones. In these embodiments, the first zone creates or modifies particles, the second zone ionizes the particles and creates a plasma jet, and the third zone accelerates the ionized particles. In some embodiments, the accelerated particles are then deposited as a film on a substrate. For example, porous media can be input into the first zone of the torch where an ECM is deposited, the second zone can ionize the ECM coated porous media particles, and the third zone accelerates the particles onto a substrate to form a dense SCM film. In other embodiments, the particles that are output from the plasma spray system are collected or are used as an input into a different downstream system.

Some other non-limiting examples of SCM materials that can be processed using a plasma torch include the following particles and coatings. In some embodiments, particles are input into the system, and these particles are modified (e.g., coated or decorated) in the first zone. Some examples of particles that can be input into the plasma torch are carbon allotropes, silicon, carbon, aluminum, and ceramics (e.g., FeSi, $SiO_x$). The input particles are not particularly limited, and many different materials can be processed using the plasma torches and the methods described herein. For example, materials with high permeability (e.g., nickel-iron soft ferromagnetic alloys), high relative permittivity (e.g., high-k dielectric materials such as perovskites), or high conductivity materials (e.g., metals) can be created and/or coated to produce materials or meta-materials for many different applications. Similarly, many different materials can be coated on the input particles using the plasma torches and methods described herein, including ECMs and active materials. Some non-limiting examples of materials that are coated onto the input particles in the first zone of the plasma torch are carbon, sulfur, silicon, iron, nickel, manganese, metal oxides (e.g., ZnO, SiO, and NiO), metal carbides (e.g., SiC and AlC), metal silicides (e.g., FeSi), metal borides, metal nitrides (SiN), and many types of ceramic materials.

In some embodiments, one or more zones of the reactors described herein can contain particle drum coaters. Particle drum coaters are reactors that can be used to deposit coatings, weld, or otherwise modify particles. In some embodiments, a particle drum coater is cylinder-shaped, particles are fed into one circular end of the cylinder-shaped coater, and an auger (i.e., an auger conveyor, or a screw conveyor, or a device for moving material by means of a rotating helical flighting) is used to transport the particles along the major axis of the cylinder. Some examples of drum coaters configured to deposit materials onto particles are drum coaters equipped with plasma CVD deposition systems, thermal CVD deposition systems, and spray liquid deposition systems. For example, silicon porous media particles can be fed into a particle drum coater equipped with a plasma CVD system, and a hydrocarbon precursor gas can be used to deposit a carbon ECM on the silicon particles. In some cases, the cylinder also rotates along the major axis to agitate the particles and improve the particle processing uniformity. Some advantages of such particle drum coaters are high throughput, continuous operation (using an auger system to continuously feed particles through the coater), and low equipment cost.

In some embodiments, zones 610 and 620 are connected such that the SCM is not exposed to air between formation in zone 610 and collection in zone 620. Similarly in some embodiments, zones 630 and 610 are connected such that the porous media is not exposed to air between formation in zone 630 and further processing in zone 610. For example, the particles described herein can be transported between zones of a reactor by gas flow, gravity, or by a physical mechanism (e.g., an auger, or conveyor belt). Alternatively, the zones can be connected such that there is a small amount of oxygen exposure between zones (e.g., less than 100 ppm in the environment). In some cases, the particles can be exposed to air, or another moderately reactive environment while being transferred between zones in a reactor are.

The reactor 700 in FIG. 7 contains a set of zones 710, 720 and optionally 730a and 730b. In some embodiments, porous media and conductive particles are fed into zone 710 where an ECM is deposited on the surfaces and/or within the pores of the porous media and conductive particles. Optionally, in zone 710, the porous media and/or conductive particles can also be broken up. The SCM is formed in zone 710 and then collected or deposited as a film directly from the reactor in zone 720 (e.g., using a reactor with an integrated plasma torch).

In some cases, the reactor 700 also includes other zones 730a and/or 730b, where the porous media and/or conductive particles are produced, respectively. In some cases, the zones 710, 730a and/or 730b are separate chambers within the reactor, and the porous media is produced in chamber 730a and exit the chamber 730a and enter the chamber 710 where the ECM is deposited, and/or the conductive particles are produced in chamber 730b and exit the chamber 730b and enter the chamber 710 where the ECM is deposited. In other cases, the zones 710, 720, 730a and/or 730b are different zones within the same chamber of the reactor 700. In other words, in some reactors an output of the first chamber is coupled to an input of the third chamber; and an output of the second chamber is coupled to an input of the third chamber.

In some embodiments, zones 710 and 720 are connected such that the SCM is not exposed to air between formation in zone 710 and collection in zone 720. Similarly in some embodiments, zones 730a and/or 730b and zone 710 are connected such that the porous media and/or the conductive particles are not exposed to air between formation in zones 730a and/or 730b and further processing in zone 710. For example, the particles described herein can be transported between zones of the reactor by gas flow, gravity, or by a physical mechanism (e.g., an auger, or conveyor belt). Alternatively, the zones can be connected such that there is a small amount of oxygen exposure between zones (e.g., less than 100 ppm in the environment). In some cases, the particles can be exposed to air, or another moderately reactive environment while being transferred between zones in the reactor and.

In some embodiments, the present porous media and/or conductive particles contain particulate carbon.

This particulate carbon can have high compositional purity, high electrical conductivity, and a high surface area compared to conventional carbon materials. In some embodiments, the particulate carbon also has a structure that is beneficial for specific applications. For example, small pore sizes and/or mesoporous structures can be beneficial to battery electrode materials, metamaterials for electromagnetic films, electrochemical sensors, and materials for impedance spectroscopy. In some cases, a mesoporous structure can be characterized by a structure with a wide distribution of pore sizes (e.g., with a multimodal distribution of pore sizes). For example, a multimodal distribution of pore sizes can be indicative of structures with high surface areas and a large quantity of small pores that are efficiently connected to the substrate and/or current collector via material in the structure with larger feature sizes (i.e., that provide more conductive pathways through the structure). Some non-limiting examples of such structures are fractal structures, dendritic structures, branching structures, and aggregate structures with different sized interconnected channels (e.g., composed of pores and/or particles that are roughly cylindrical and/or spherical).

In some embodiments, the particulate carbon materials contained in the porous media and/or conductive particles described herein are produced using microwave plasma reactors and methods, such as any appropriate microwave reactor and/or method described in U.S. Pat. No. 9,812,295, entitled "Microwave Chemical Processing," or in U.S. Pat. No. 9,767,992, entitled "Microwave Chemical Processing Reactor," which are assigned to the same assignee as the present application, and are incorporated herein by reference as if fully set forth herein for all purposes. Additional information and embodiments for microwave plasma gas processing system methods and apparatuses to produce the carbon nanoparticles and aggregates described herein are also described in the related U.S. patents and patent Applications mentioned in this disclosure.

In some embodiments, the particulate carbon materials in the porous media and/or conductive particles described herein are described in U.S. Pat. No. 9,997,334, entitled "Seedless Particles with Carbon Allotropes," which is assigned to the same assignee as the present application, and is incorporated herein by reference as if fully set forth herein for all purposes. In some embodiments, the particulate carbon materials contain graphene-based carbon materials that comprise a plurality of carbon aggregates, each carbon aggregate having a plurality of carbon nanoparticles, each carbon nanoparticle including graphene, optionally including multi-walled spherical fullerenes, and optionally with no seed particles (i.e., with no nucleation particle). In some cases, the particulate carbon materials are also produced without using a catalyst. The graphene in the graphene-based carbon material has up to 15 layers. A ratio percentage of carbon to other elements, except hydrogen, in the carbon aggregates is greater than 99%. A median size of the carbon aggregates is from 1 micron to 50 microns, or from 0.1 microns to 50 microns. A surface area of the carbon aggregates is at least 10 $m^2/g$, or is at least 50 $m^2/g$, or is from 10 $m^2/g$ to 300 $m^2/g$, or is from 50 $m^2/g$ to 300 $m^2/g$, when measured using a Brunauer-Emmett-Teller (BET) method with nitrogen as the adsorbate. The carbon aggregates, when compressed, have an electrical conductivity greater than 500 S/m, or greater than 5000 S/m, or from 500 S/m to 20,000 S/m.

In some embodiments, the particulate carbon materials in the porous media and/or conductive particles described herein are described in U.S. Pat. No. 9,862,606 entitled "Carbon Allotropes," which is assigned to the same assignee as the present application, and is incorporated herein by reference as if fully set forth herein for all purposes. In some embodiments, the particulate carbon materials contain carbon nanoparticles comprising at least two connected multi-walled spherical fullerenes, and layers of graphene coating the connected multi-walled spherical fullerenes. Additionally, the carbon allotropes within the carbon nanoparticles can be well ordered. For example, a Raman spectrum of the carbon nanoparticle using 532 nm incident light can have a first Raman peak at approximately 1350 $cm^{-1}$ and a second Raman peak at approximately 1580 $cm^{-1}$, and a ratio of an intensity of the first Raman peak to an intensity of the second Raman peak is from 0.9 to 1.1. In some cases, the atomic ratio of graphene to multi-walled spherical fullerenes is from 10% to 80% within the carbon nanoparticles.

In some embodiments, the particulate carbon materials described herein are produced using thermal cracking apparatuses and methods, such as any appropriate thermal apparatus and/or method described in U.S. patent application Ser. No. 9,862,602, entitled "Cracking of a Process Gas," which is assigned to the same assignee as the present application, and is incorporated herein by reference as if fully set forth herein for all purposes. Additional information and embodiments for thermal cracking methods and apparatuses to produce the carbon nanoparticles and aggregates described herein are also described in the in the related U.S. patents and patent Applications mentioned in this disclosure.

In some embodiments, the particulate carbon in the porous media and/or conductive particles contains more than one type of carbon allotrope. For example, the particulate carbon can contain graphene, spherical fullerenes, carbon nanotubes, amorphous carbon, and/or other carbon allotropes. Some of these carbon allotropes are further described in the related U.S. patents and patent Applications mentioned in this disclosure. Additionally, the different carbon allotropes in the particulate carbon can have different morphologies, such as mixtures of low and high aspect ratios, low and high surface areas, and/or mesoporous and non-mesoporous structures. The use of particulate carbon with combinations of different allotropes (and in some cases different morphologies) can enhance the electrical and mechanical properties of battery electrodes. The mass ratio of a first carbon allotrope (e.g., with high electrical conductivity and/or a mesoporous structure) to a second carbon allotrope (e.g., a long chain carbon allotrope) in the particulate carbon can be from 70:30 to 99:1, or from 80:20 to 90:10, or from 85:15 to 95:5, or is about 85:15, or is about 90:10, or is about 95:5. For example, mesoporous carbon allotropes in the particulate carbon can provide high surface area and/or high electrical conductivity, and the addition of long chain (i.e., high aspect ratio) carbon allotropes in the particulate carbon can improve the mechanical strength, adhesion and/or durability of the battery, cathode and/or anode.

In some embodiments, the particulate carbon in the porous media and/or conductive particles contains particles containing graphene (e.g., with one or more of the properties described herein), and particles containing long chain carbon allotropes (e.g., spherical fullerenes connected in a string-like arrangement, or carbon nanotube bundles). In some embodiments, the long chain carbon allotropes have aspect ratios greater than 10:1, or from 10:1 to 100:1, or about 10:1, or about 20:1, or about 50:1, or about 100:1. In some embodiments, the long chain carbon allotropes have dimensions from 50 nm to 200 nm wide by up to 10 microns in length, or from 10 nm to 200 nm wide by from 2 microns to 10 microns in length. Additional particles containing long chain carbon allotropes are described in the related U.S. patents and patent Applications mentioned in this disclosure. The mass ratio of a graphene-containing carbon allotrope to a long chain carbon allotrope in the particulate carbon can be about 85:15, or about 90:10, or about 95:5. In some embodiments, the long chain carbon allotropes can interlock with other conductive (and in some cases structured, or mesoporous) carbon allotropes in the particulate carbon and can form an interlocked hybrid composite allotrope electrode with improved mechanical properties compared to electrodes without long chain carbon allotropes. In some embodiments, the addition of long chain (e.g., fibrous like) carbon increases the medium range (e.g., 1 micron to 10 microns) conductivity, and increases the distribution of the other carbon allotrope (e.g., prevents agglomeration of the other carbon allotrope, such as mesoporous graphene particles), while improving mechanical stability of the SCM. Furthermore, the addition of long chain carbon allotropes can provide additional porosity around the carbon chain, which increases ion conductivity and mobility in the electrode.

For example, the long chain carbons enable reduced calendaring pressure during lithium ion battery electrode fabrication (leading to electrodes with increased local voltage or porosity), while maintaining the same (or better) mechanical stability (i.e., tolerance to delamination and/or cracking) as electrodes without long chain carbons that are calendared at higher pressures. Reduced calendaring pressure can be advantageous to lithium ion battery electrodes because the higher porosity achieved using a lower pressure leads to increase ion conductivity and/or mobility. Additionally, in some embodiments, the addition of long chain carbon (e.g., fibers) can improve the elongation/strain tolerance of lithium ion battery electrodes over conventional slurry cast electrodes. In some cases, the elongation/strain tolerance (e.g., the maximum strain to failure, or the amount of performance degradation for a given strain) can be increased by as much as 50% over conventional slurry cast electrodes. In some structures in this example, the addition of long chain carbon allotropes to the particulate carbon in a lithium ion battery electrode enables the use of less binder, or the elimination of the binder, in the electrode.

In a non-limiting example, a mechanically robust, hybrid composite lithium ion battery electrode film can contain particulate carbon with a combination of lower density (e.g., mesoporous), hierarchical graphene-containing particles (e.g., with particle sizes from 15 to 40 microns in diameter) and higher density particles containing long chains of connected spherical fullerenes (e.g., with sizes 50 to 200 nm wide by up to 10 microns in length). The mass ratio of graphene carbon allotropes to the long chain allotropes in this example is about 85:15. The particulate carbon in this example has high electrical conductivity (due to the high electrical conductivity of the graphene and/or spherical fullerenes), and the long chain allotropes provide mechanical reinforcement.

In some embodiments, the particulate carbon in the porous media and/or conductive particles is doped with another material (e.g., H, O, N, S, Li, Cl, F, Si, Se, Sb, Sn, Ga, As, and/or other metals). Doping can be advantageous because it can tune the properties of the particulate carbon. For example, doping with a metal can improve the conductivity of the particulate carbon, and doping with oxygen can change the surface energy of the particulate carbon making it easier to disperse in liquids.

Lithium ion batteries are an example application that can benefit from the materials and processes described herein. The present SCMs can include beneficial materials and structures for cathodes and/or anodes in lithium ion batteries (e.g., Li/S or Si—S-graphene batteries).

Some examples of active materials for SCMs that can be used in cathodes for lithium ion batteries include sulfur materials. Some examples of sulfur materials used in cathodes are S, $Li_2S$, $Li_xS_y$ (where x=0-2 and y=1-8), doped S, doped $Li_2S$, or combinations thereof. In some embodiments, the cathodes can contain composite materials containing S, $Li_2S$, $Li_xS_y$, doped S, doped $Li_2S$, doped $Li_xS$, NCM, LFP, or combinations thereof, either in the form of a solid or as a suspension/dissolved solution. Some examples of doped S, doped $Li_2S$, or doped $Li_xS$ include S, $Li_2S$, or $Li_xS$, doped with P, N, C and/or F. In some embodiments, the cathode contains particles containing $Li_xS_y$ (e.g., where x=0-2 and y=1-8), with particle sizes from 5 nm to 100 microns.

In some embodiments, the SCMs are used in a cathode mixture for a lithium ion battery, which can be formed from a slurry, and the SCMs contain a material containing sulfur, as well as one or more particulate carbon materials, and optionally one or more binders. In some embodiments, the cathode mixture contains an SCM material (e.g., containing sulfur, and one or more particulate carbon materials) mixed with a conventional lithium ion cathode material such as NCM or LFP.

Some examples of active anode materials for SCMs used in lithium ion batteries include silicon materials. Some examples of silicon materials used in the anodes are elemental silicon, lithium-silicon compounds, silicon-carbon composites, and lithium-silicon-carbon composites. Some examples of lithium-silicon compounds are $Li_{22}Si_5$, $Li_{22-x}Si_{5-y}$ (where x=0-21.9, and y=1-4.9), and $Li_{22-x}Si_{5-y-z}M_z$ (where x=0-21.9, y=1-4.9, z=1-4.9. and M is S, Se, Sb, Sn, Ga, or As). The silicon materials can be amorphous, crystalline, semi-crystalline, nano-crystalline, or poly-crystalline in different embodiments.

In some embodiments, the SCMs can be included in an anode mixture containing a silicon material (e.g., elemental Si, LiSi, silicon-doped CNOs), one or more particulate carbons, one or more polymeric materials, optionally an oxygen-containing material (e.g., graphene oxide), and optionally one or more binders. In some embodiments, the SCMs used in the anode mixtures contain silicon particles coated with carbon materials, as described herein. In some embodiments, the SCMs used in the anode mixtures contain core-shell particles containing silicon, with either silicon or carbon materials at the core. In some embodiments, the SCMs used in the anode mixtures contain multi-layer particles containing one or more layers of silicon and one or more layers of carbon, with either silicon or carbon materials at the core.

In some embodiments, a Li/S battery with sulfur containing cathodes is fabricated using the methods described herein, including depositing a sulfur-containing cathodic (i.e., active) materials within the pores of an SCM containing an ECM. In some embodiments, the sulfur containing active material coats the surfaces of the SCM, diffuses into the pores, fills the pores, and/or partially fills the pores of the SCM. In some embodiments, the battery is cycled one time, and the sulfur containing active materials in the cathode form polysulfides, which then migrate to further fill the pores of the SCM. However, the beneficial morphology and chemical composition of the SCM prevents the polysulfides from migrating to the anode, thereby mitigating that particular degradation mechanism.

In some embodiments, a Li/S battery with a silicon containing anode is fabricated using the methods described herein. In some cases, silicon-containing anodic materials are deposited within the pores of an SCM containing a porous media and an ECM. In other cases, porous media containing silicon are fed into a reactor and coated with ECM. In some cases, the active silicon-containing anodic materials for the Li/S battery anode contain silicon-containing particles with average particle size less than 100 nm, or less than 50 nm. This small size of the SCM can be advantageous to prevent the Si containing anode materials from degrading, which commonly occurs in conventional silicon-containing anodes due to expansion of Si during battery operation. For example, in Li/S batteries with anodes containing large Si particles (e.g., with average diameters greater than about 100 nm, or greater than about 50 nm), the expanded larger particles can fracture during battery operation due to the large volume expansion of Si during battery operation, leading to degradation of battery performance. In contrast, in Li/S batteries with anodes containing smaller Si particles (e.g., with average diameters less than about 100 nm, or less than about 50 nm), the expanded size of the particles is relatively small, which mitigates fracturing of the Si particles during battery operation, leading to improved device durability.

EXAMPLES

Example 1

In a non-limiting example, carbon particles and aggregates containing graphite and graphene that can be used as the porous media and/or conductive particles for SCMs were generated using a microwave plasma reactor system, described in U.S. Pat. No. 9,767,992, entitled "Microwave Chemical Processing Reactor." The microwave plasma reactor in this example had a main body made from stainless steel with a quartz inner wall material. However, the quartz inner wall material is not needed in all cases, and similar carbon materials can be produced in reactors without quartz in or adjacent to the reaction zone. In some embodiments, it is beneficial to produce the particulate carbon in a reactor that does not have quartz in or adjacent to the reaction zone, because materials, such as oxygen, can decompose out of the quartz and become incorporated as unwanted impurities in the produced carbon materials. The reaction zone volume was approximately 45 $cm^3$. The precursor material was methane and was optionally mixed with a supply gas (e.g., argon). The flow rate of methane was from 1 to 20 L/min, the flow rate of the supply gas was from 0 to 70 L/min. With those flow rates and the tool geometry, the residence time of the gas in the reaction chamber was from approximately 0.001 second to approximately 2.0 seconds, and the carbon particle production rate was from approximately 0.1 g/hr to approximately 15 g/hr. After the aggregates were synthesized and collected, they were post-processed by annealing at a temperature from 1000 to 2200° C. in an inert atmosphere for a duration of approximately 60 to approximately 600 minutes.

The particles produced in this example contained carbon aggregates containing a plurality of carbon nanoparticles, where each carbon nanoparticle contained graphite and graphene and did not contain seed particles. The particles in this example had a ratio percentage of carbon to other elements (other than hydrogen) of approximately 99.97% or greater.

Figure 8A:
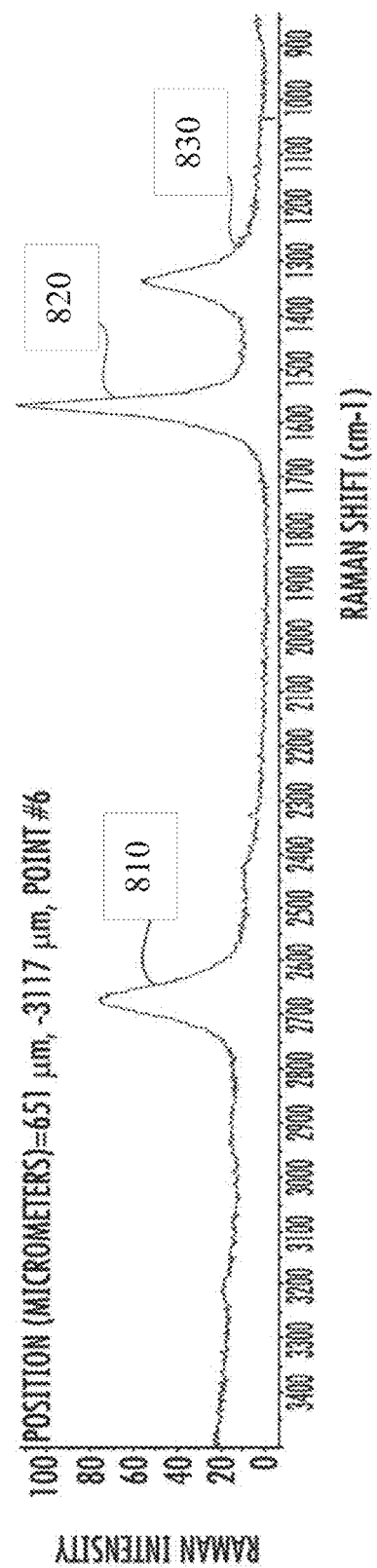
FIG. 8A shows a Raman spectrum from particulate carbon containing graphene, in accordance with some embodiments.

FIG. 8A shows a Raman spectrum of the particulate carbon of this example, taken using 532 nm incident light. The particles in FIG. 8A were produced using precursors containing argon. The spectrum has a 2D-mode peak 810 at approximately 2690 $cm^{-1}$, a G-mode peak 820 at approximately 1580 $cm^{-1}$, and a D-mode peak 830 at approximately 1350 $cm^{-1}$, and the 2D/G intensity ratio is greater than 0.5. The 2D/G intensity ratio for the particles produced in FIG. 8A is approximately 0.7.

The size of the aggregates in this example have a median of approximately 11.2 microns as-synthesized, and approximately 11.6 microns after annealing. The size distribution of the as-synthesized aggregates had a $10^{th}$ percentile of approximately 2.7 microns, and a $90^{th}$ percentile of approximately 18.3 microns. The annealed aggregates size distribution had a $10^{th}$ percentile of approximately 4.2 microns, and a $90^{th}$ percentile of approximately 25.5 microns.

The electrical conductivity of the aggregates was measured after being compressed into pellets. The as-synthesized (i.e., before annealing) material had a conductivity of 800 S/m when compressed using 2000 psi of pressure, and a conductivity of 1200 S/m when compressed using 12,000 psi of pressure. The annealed material had a conductivity of 1600 S/m when compressed using 2000 psi of pressure, and a conductivity of 3600 S/m when compressed using 12,000 psi of pressure.

Figure 8B:
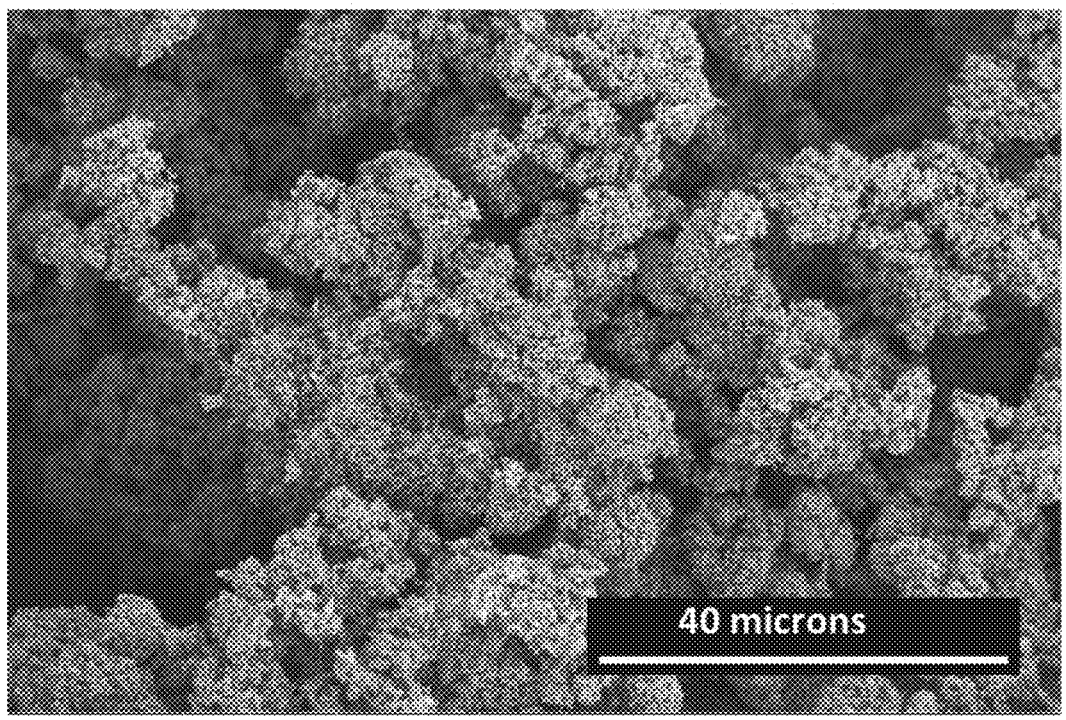
FIGS. 8B and 8C show scanning electron microscope (SEM) images from particulate carbon containing graphene, in accordance with some embodiments.
Figure 8C:
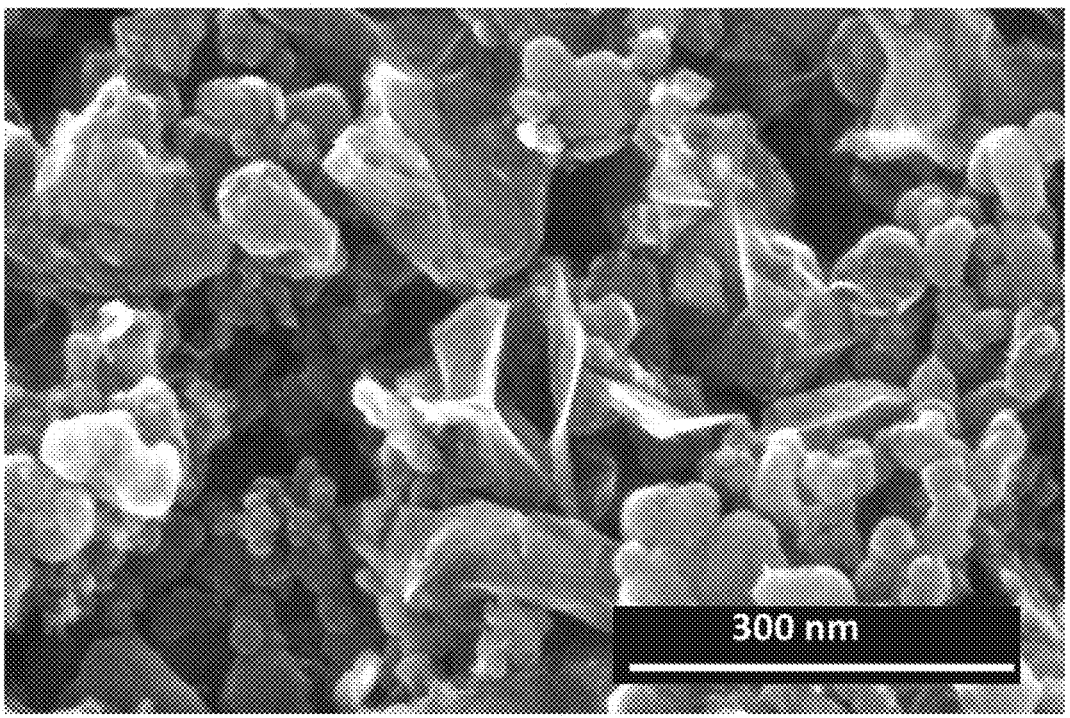
Figure 8D:
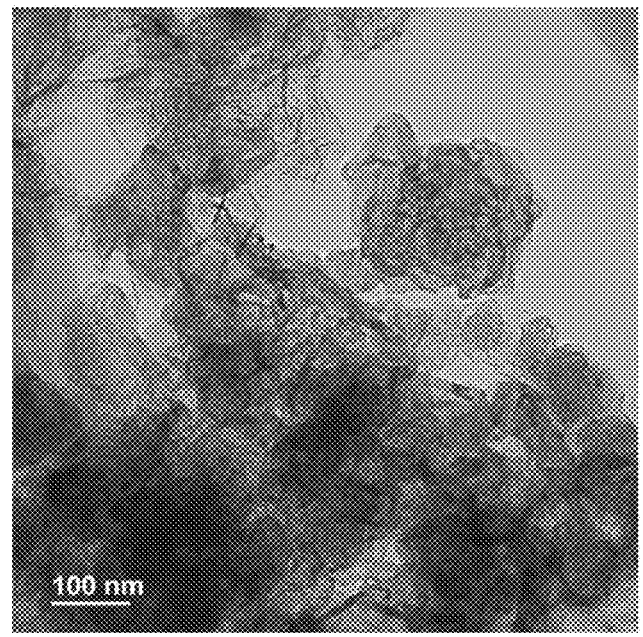
FIGS. 8D and 8E show transmission electron microscope (TEM) images from particulate carbon containing graphene, in accordance with some embodiments.
Figure 8E:
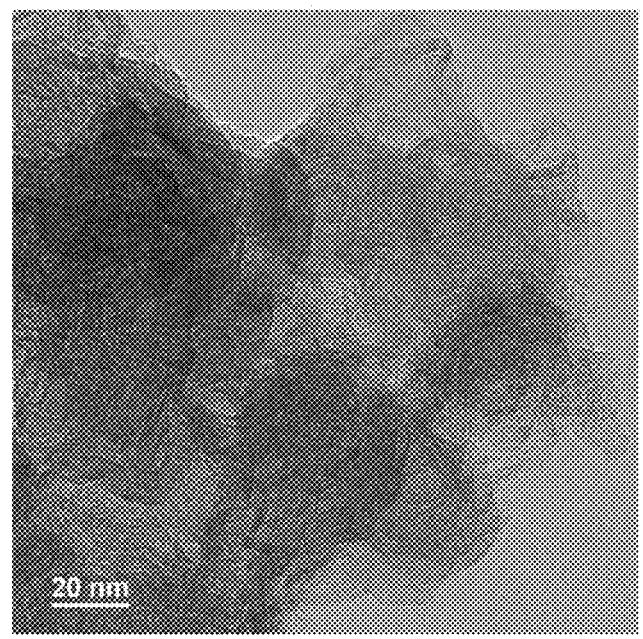

FIGS. 8B and 8C show SEM images, and FIGS. 8D and 8E show TEM images, of the carbon aggregates of the particulate carbon of this example showing graphite and graphene allotropes. The layered graphene is clearly shown within the distortion (wrinkles) of the carbon. The 3D structure of the carbon allotropes is also visible. The carbon allotropes in this example have a 3D structure with a hierarchical mesoporous, few layer, graphene structure with a specific edge-to-basal plane ratio. In some embodiments, the edge-to-basal plane ratio for the graphene in the present particulate carbon is about 1:10, or about 1:100, or from 1:10 to 1:100.

The surface area of the aggregates in this example were measured using the nitrogen BET method and the density functional theory (DFT) method. The surface area of the aggregates as determined by the BET method was approximately 85.9 m$^2$/g. The surface area of the aggregates as determined by the DFT method was approximately 93.5 m$^2$/g.

In contrast to conventionally produced carbon materials, the carbon particles and aggregates produced by the microwave plasma reactor in this example contained graphite and graphene that had high purity, high electrical conductivities, and large surface areas. Additionally, these particles had Raman signatures indicating a high degree of order, and contained no seed particles.

Example 2

Figure 9A:
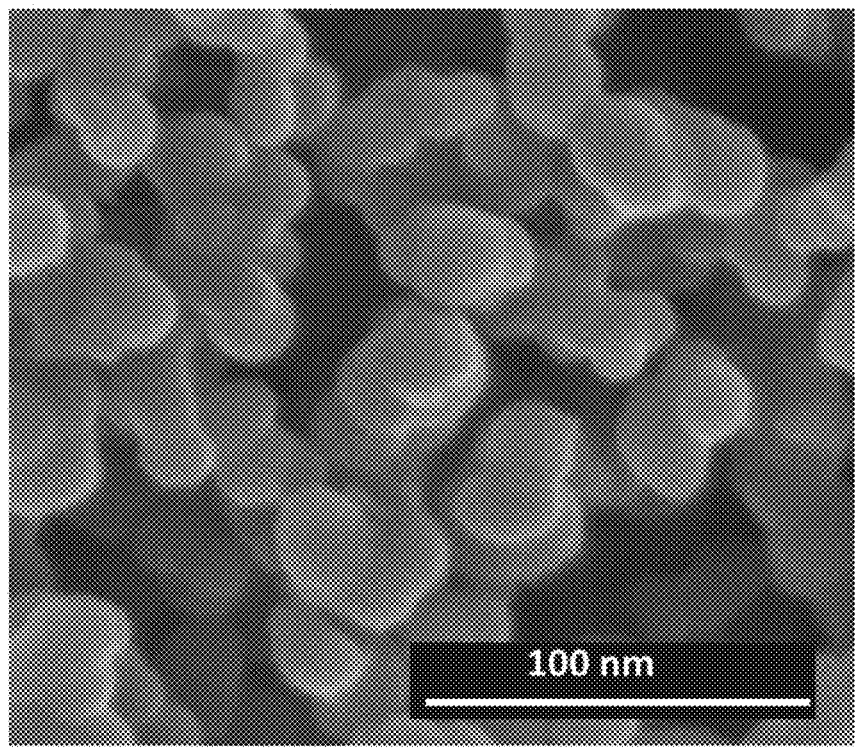
FIG. 9A shows an SEM image of an example of a carbon-based porous media, in accordance with some embodiments.
Figure 9B:
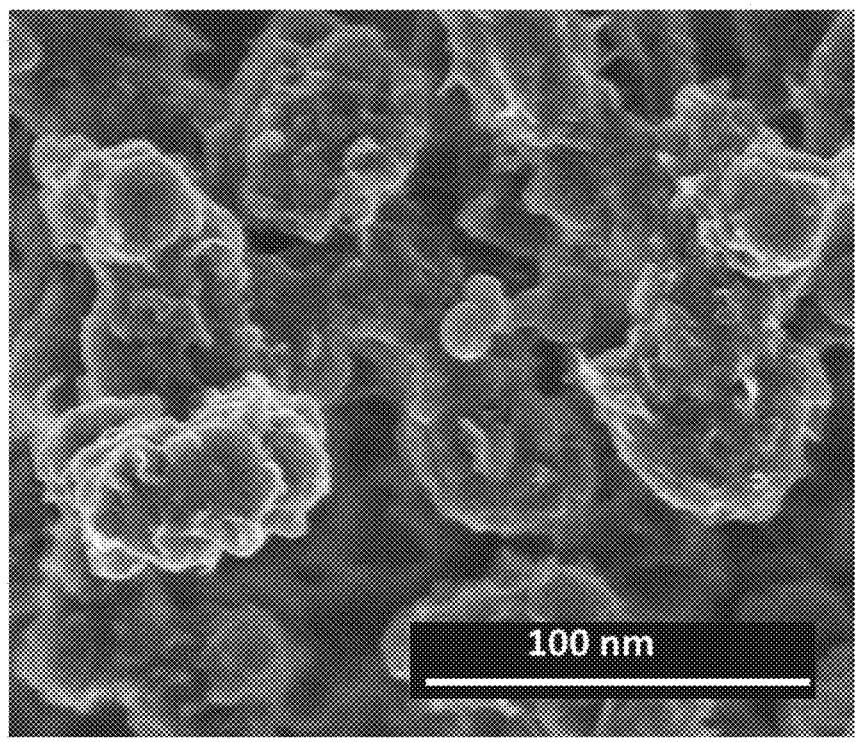
FIG. 9B shows an SEM image of the carbon-based porous media after it has been coated with a carbon-based ECM, in accordance with some embodiments.

In this example, porous media are coated with an ECM, using a process similar to process 100 from FIG. 1. FIG. 9A is an SEM image of an example of a carbon-based porous media produced using a microwave plasma reactor, as described herein. The porous media in this example contained platelets with sizes about 20 nm to 40 nm across, and pore sizes from about 100 nm to 200 nm across. FIG. 9B shows an SEM image of the carbon-based porous media after it has been coated with a carbon-based ECM. The SCM shown in FIG. 9B has smaller pores than the porous media in FIG. 9A, since the pores have been somewhat filled in by the ECM. The ECM in this example is also structured, as can be seen from the rough surface morphology of the SCM in FIG. 9B (compared to the smoother surface morphology of the porous media in FIG. 9A). The structure of the SCM in this example is mesoporous and contains a bi-modal pore size distribution. The mesoporous structure in this example contains nanometer-scale pores provided by the structured ECM interspersed within a 3D web of thicker more conductive branches provided by the scaffold structure of the porous media and the semi-continuous deposited ECM network. The SCM shown in FIG. 9B could be an intermediate product, where the next step would be for an active material to be conformally deposited within the pores of the SCM. In other cases, the surfaces of the SCM shown in FIG. 9B could be functionalized with an active material and the functionalized SCM could then be used as a reinforcing filler for elastomeric materials.

Examples 3-8

Figure 10:
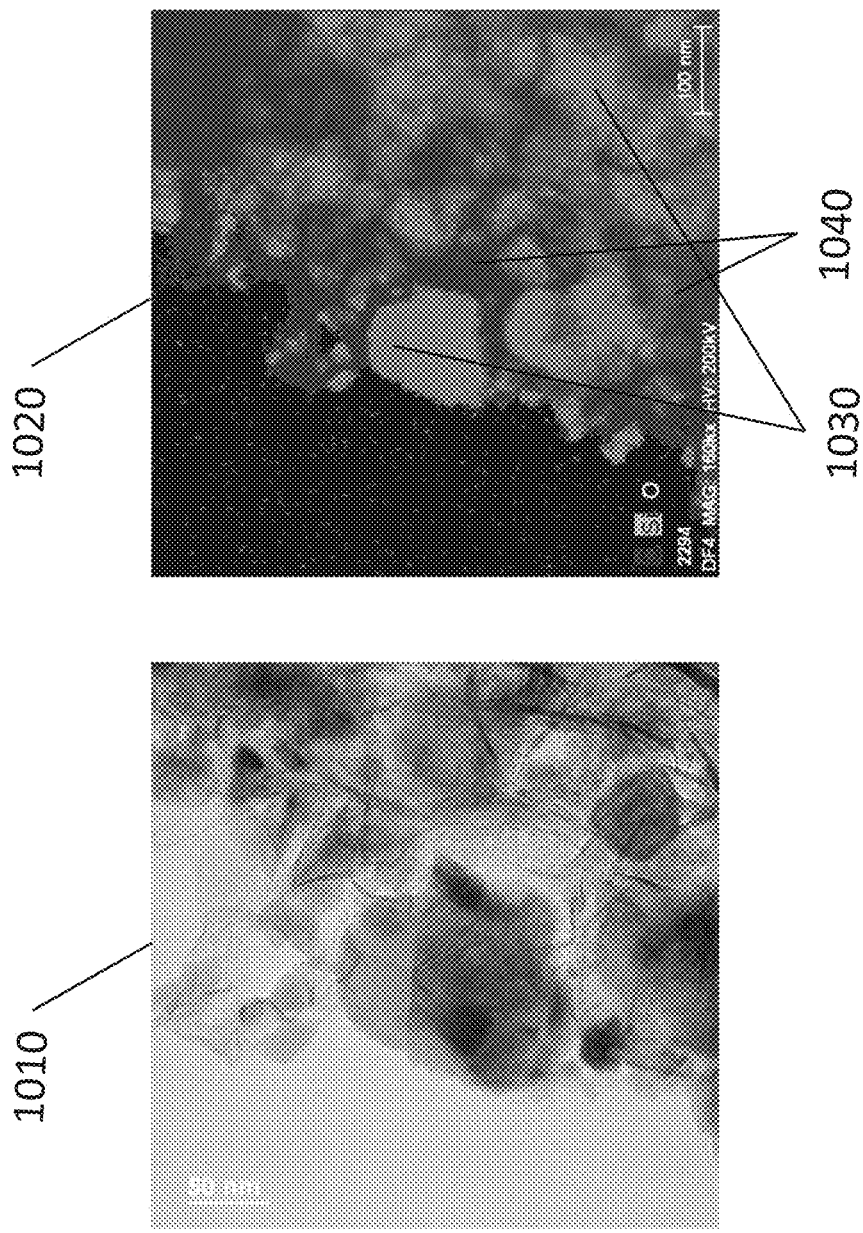
FIG. 10 shows a TEM image with an electron energy loss spectroscopy (EELS) image of an SCM containing silicon particles within a microwave reactor produced carbon-based electrically conductive matrix, in accordance with some embodiments.
Figure 11:
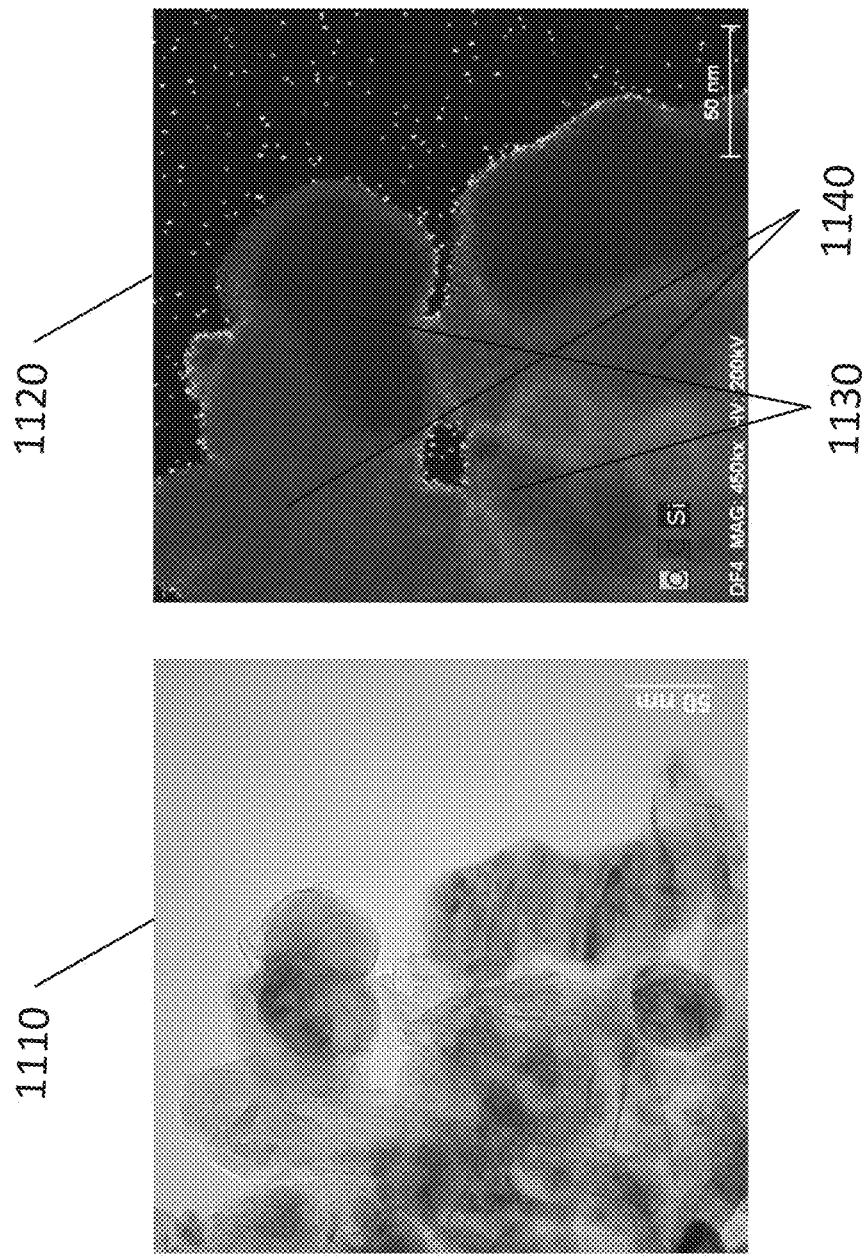
FIG. 11 shows a TEM image with an EELS image of an SCM containing pre-treated silicon particles within a carbon-based electrically conductive matrix, in accordance with some embodiments.
Figure 12:
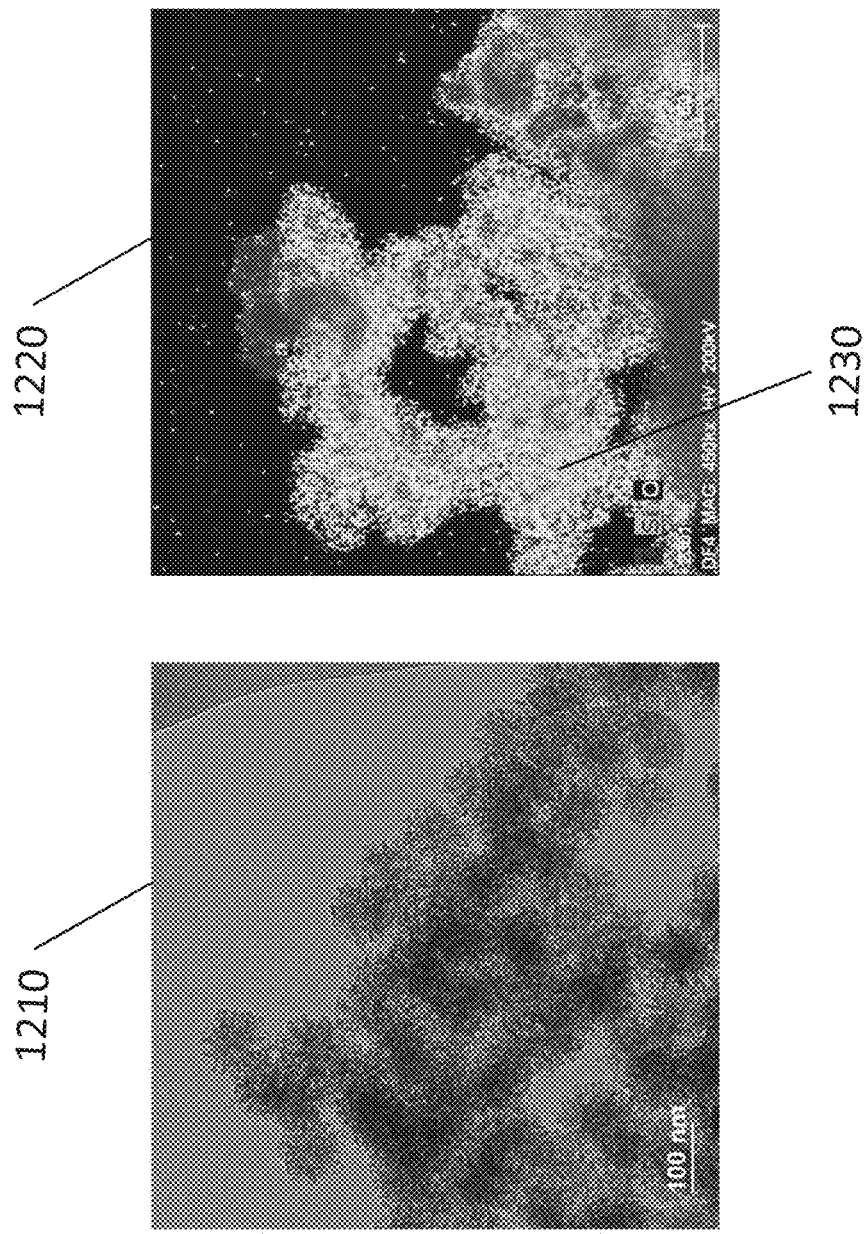
FIG. 12 shows a TEM image with an EELS image of an SCM containing star shaped silicon particles within a carbon-based electrically conductive matrix, in accordance with some embodiments.
Figure 13:
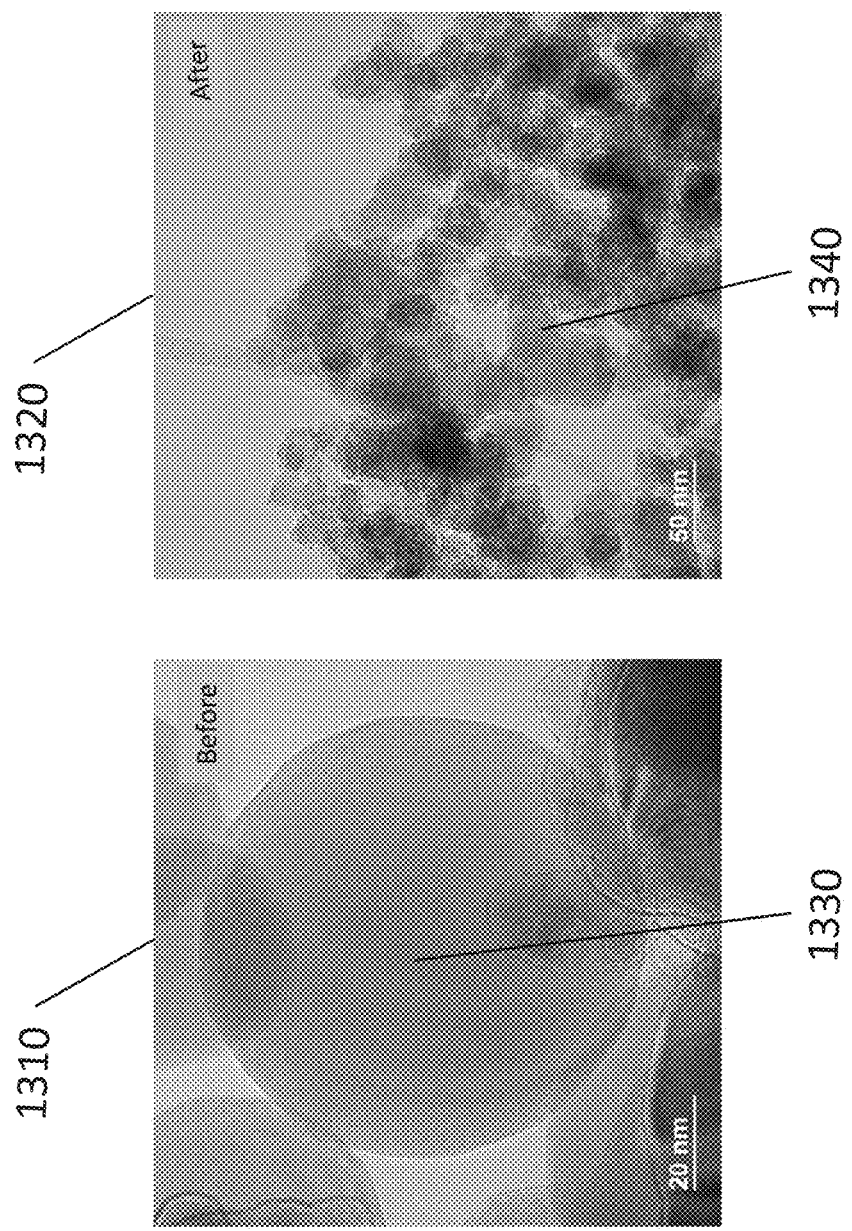
FIG. 13 shows TEM images of silicon particles before and after being processed in a microwave plasma reactor, in accordance with some embodiments.
Figure 14:
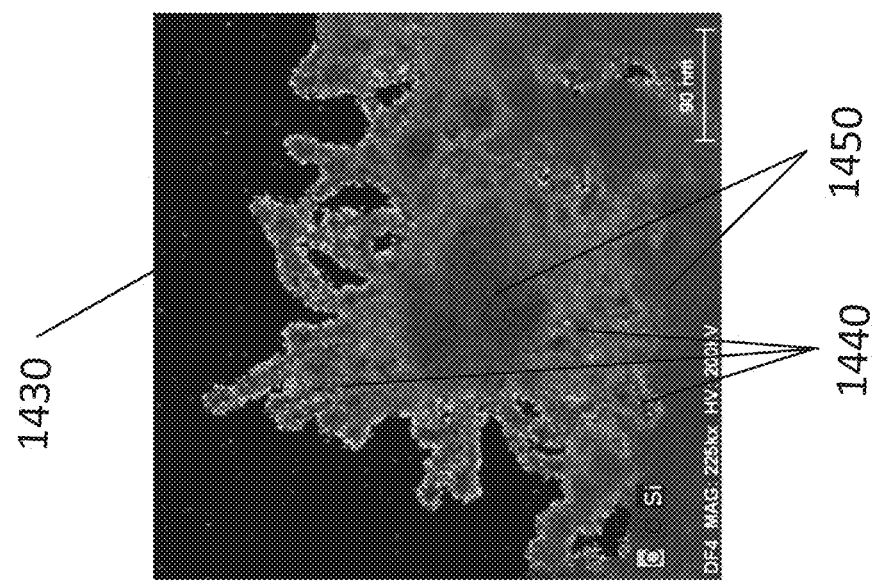
FIG. 14 shows TEM images and an EELS image of an SCM containing silicon particles with dendritic chains within a carbon-based electrically conductive matrix, in accordance with some embodiments.
Figure 14:
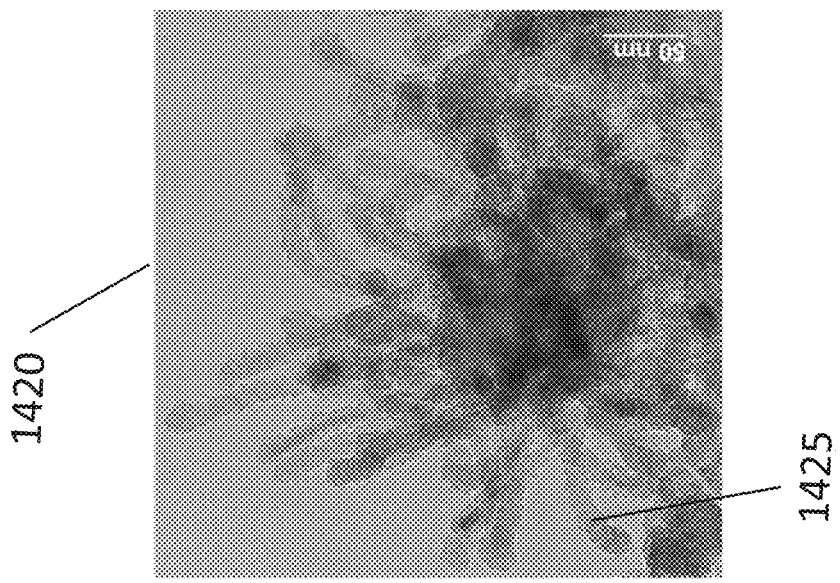
Figure 14:
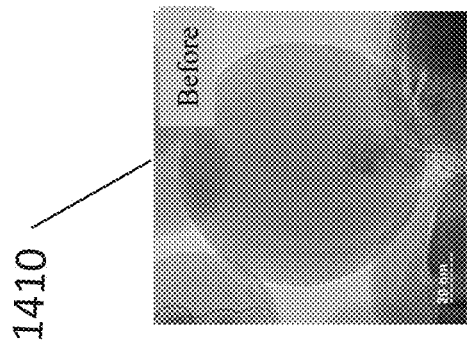
Figure 15:
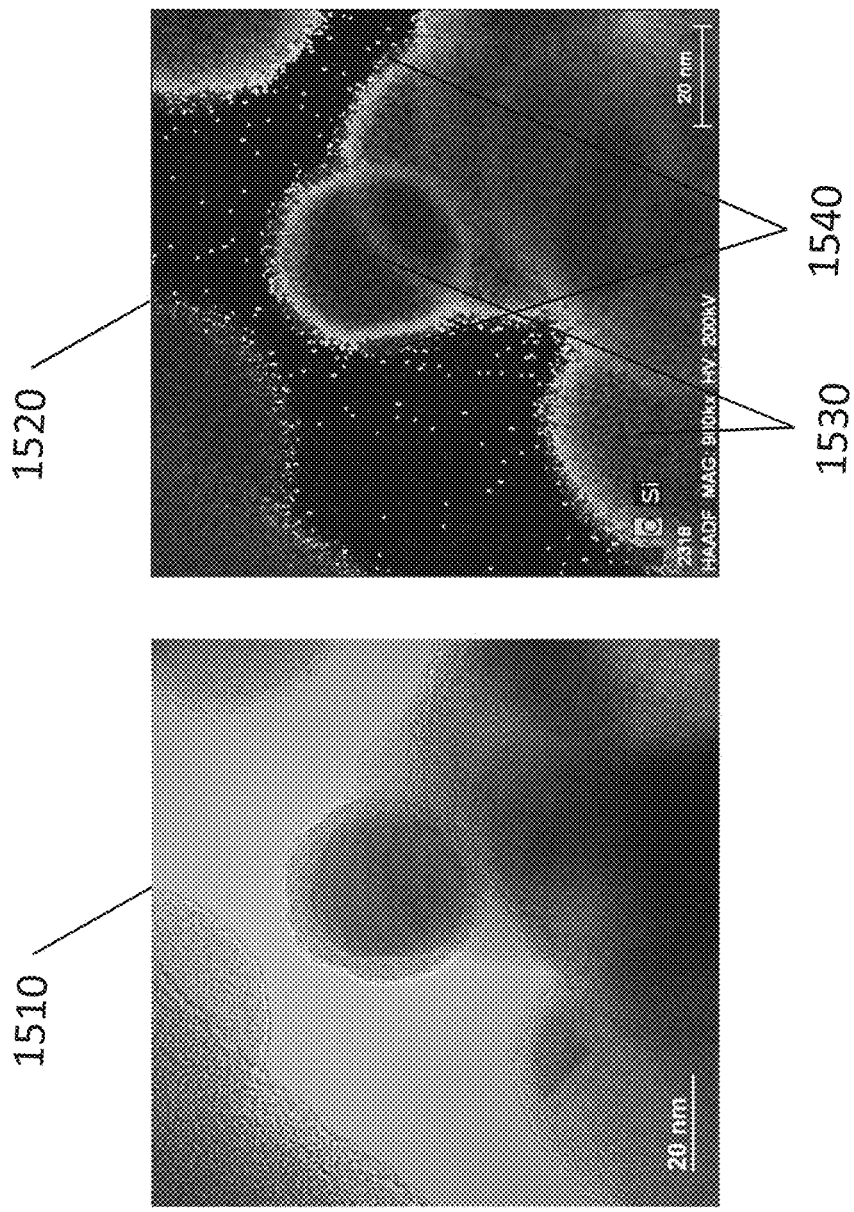
FIG. 15 shows a TEM image with an EELS image of an SCM containing silicon particles within a thermally produced carbon-based electrically conductive matrix, in accordance with some embodiments.

FIGS. 10-15 show example results of SCMs containing porous media coated with ECMs. The SCMs shown in FIGS. 10-14 were processed in a microwave plasma reactor, similar to the process shown in 120 in FIG. 1 or 240 in FIG. 2A. FIGS. 10 and 11 show examples where porous media was coated with ECMs in a microwave plasma reactor. FIG. 12 shows an example where porous media with very high surface area was coated with ECMs in a microwave plasma reactor. FIG. 13 shows an example where porous media was broken up in situ in a microwave plasma reactor. FIG. 14 shows an example where porous media was broken up and ECMs were deposited in a microwave plasma reactor in a single step. FIG. 15 shows an example where porous media was coated with ECMs in a thermal reactor.

Example 3

FIG. 10 shows an example of an SCM containing silicon particles within a carbon-based electrically conductive matrix. The porous media in this example were silicon particles, which were broken up during processing by cracking along their cleavage planes. In some embodiments, the input silicon particles have average diameter from 10 nm to 10 microns, or from 10 nm to 1 micron, or less than 1 micron, or less than 500 nm, or less than 100 nm. A carrier fluid was mixed with the silicon porous media particles within a reactor where the carrier fluid was separated to form an ECM, which was deposited on the surfaces of the silicon particles. The carrier fluid in this example was a hydrocarbon gas (methane), which was mixed with the silicon particles within a microwave plasma reactor (i.e., the silicon particles were fed dry into the reactor, and the hydrocarbon gas was fed into the reactor using a separate inlet). The hydrocarbon gas decomposed into separated components in the reactor including conductive carbon allotropes, which coated and fused (i.e., coalesced, or welded) the silicon particles together to form the SCM in FIG. 10. The transmission electron microscope (TEM) image 1010 shows the porous morphology of the SCM. The electron energy loss spectroscopy (EELS) image 1020 shows the elemental map of the SCM shown in 1010. The EELS image 1020 shows the silicon porous media 1030 surrounded by the matrix of carbon ECM 1040. The breaking up of the silicon porous media particles during production was beneficial to lithium ion battery anodes because the increased number of surfaces increased the capacity of the battery. The deposited carbon ECM material formed a conductive network to electrically connect the active silicon surfaces to a battery electrode conductive substrate.

Example 4

FIG. 11 shows an example of an SCM containing silicon particles within a carbon-based electrically conductive matrix, produced using similar methods as the SCM in Example 3. The porous media in this example were silicon particles, which were pre-treated before injection into a microwave plasma reactor. For example, in some experiments, the Si particles were pre-treated by etching oxides before injection into the microwave plasma reactor (e.g., using a chemical etch and/or exposing the particles to a reducing environment). The carrier fluid in this example was a mixture of acetone and IPA (e.g., 50% acetone and 50% IPA) and was mixed with the pre-treated silicon particles before injection into the reactor. A hydrocarbon gas (e.g., methane) was also mixed with the carrier fluid mixture within the microwave plasma reactor (i.e., the carrier fluid mixture and the hydrocarbon gas were fed into the reactor using two separate inlets). The hydrocarbon gas and the carrier fluid decomposed into separated components in the reactor including conductive carbon allotropes, which coated and fused (i.e., coalesced, or welded) the silicon particles together forming the SCM. The TEM image 1110 shows the porous morphology of the SCM. The EELS image 1120 shows the elemental map of the SCM shown in 1110. The EELS image 1120 shows the silicon porous media 1130 surrounded by the matrix of carbon ECM 1140.

Example 5

FIG. 12 shows an example of an SCM containing silicon particles within a carbon-based electrically conductive matrix, produced using similar methods as the SCM in Example 3. The porous media in this example contained silicon nanoparticles, which were star-shaped structured particles less than about 100 nm in diameter. The star-shaped particles provide high surface area for forming an electrically conductive matrix. The carrier fluid in this example was a mixture of acetone and IPA (e.g., 50% acetone and 50% IPA) and was mixed with the silicon particles before injection into the microwave plasma reactor. A hydrocarbon gas (e.g., methane) was also mixed with the carrier fluid mixture within the microwave plasma reactor (i.e., the carrier fluid mixture and the hydrocarbon gas were fed into the reactor using two separate inlets). The hydrocarbon gas and the carrier fluid decomposed into separated components in the reactor including conductive carbon allotropes, which coated and fused (i.e., coalesced, or welded) the silicon star-shaped particles together forming the SCM. The TEM image 1210 shows the porous morphology of the SCM. The EELS image 1220 shows the elemental map of the SCM shown in 1210. The EELS image 1220 shows regions 1230 of small scale mixing of the silicon porous media surrounded by the matrix of carbon ECM. These regions 1230 also show more oxygen than the SCMs shown in FIGS. 10-11. In this case, the addition of oxygen (e.g., in hydroxy groups) on the carbon-containing surfaces of the SCMs changed the surface energy and wettability of the SCMs, enabling them to more easily disperse in a fluid, and enabling a subsequent fluid to more easily penetrate the pores of the SCM.

Example 6

FIG. 13 shows an example of silicon particles before and after being processed in a microwave plasma reactor, illustrating how some particles can be broken up during the processes described herein. As shown in the TEM image 1310, before being processed in the microwave plasma reactor, the silicon particles were roughly spherical 1330. As shown in TEM image 1320, after the microwave plasma processing, the spherical particles 1330 were broken into smaller irregular shaped particles 1340. The broken particles in this example were roughly elliptical in shape with jagged edges. The particles were smaller, as well as geometrically different, from the primary Si particles injected, both of which caused an increase in surface area of the particles. This is advantageous for certain applications where high surface area, and small particle sizes are desired.

Example 7

FIG. 14 shows an example of an SCM containing silicon particles with dendritic chains within a carbon-based electrically conductive matrix, produced using similar methods as the SCM in Example 3. A dendritic morphology can provide high surface area for forming an electrically conductive matrix. The porous media in this example contained silicon nanoparticles, which were fed into the microwave plasma reactor as roughly spherical shaped particles, as shown in image 1410. The silicon particles fed into the reactor in this example also had a thin oxide coating. The carrier fluid in this example was hexane and was mixed with the silicon particles in an inert environment before injection into the reactor. A hydrocarbon gas (e.g., methane) was also mixed with the carrier fluid mixture within the microwave plasma reactor (i.e., the carrier fluid mixture and the hydrocarbon gas were fed into the reactor using two separate inlets). The microwave plasma broke up the roughly spherical silicon particles into smaller irregular shaped particles, similarly to the example shown in FIG. 13. The hydrocarbon gas and the carrier fluid decomposed into separated components in the reactor including conductive carbon allotropes, which coated and fused (i.e., coalesced; welded) the broken silicon particles together forming the SCM. The TEM image 1420 shows the porous morphology of the SCM, including the irregular broken silicon particles, which formed dendritic chains 1425. The EELS image 1430 shows the elemental map of the SCM shown in image 1420. The EELS image 1430 shows the silicon porous media 1440 surrounded by the matrix of carbon ECM 1450. The silicon porous media regions 740 also show more oxygen than the SCMs shown in FIGS. 10-11, and less oxygen than the materials shown in FIG. 12.

Example 8

FIG. 15 shows an example of an SCM containing silicon particles within a carbon-based electrically conductive matrix, where the silicon particles were fed into a thermal reactor as a dry material. The porous media in this example contained silicon particles with average diameter less than about 1 micron. The silicon particles were premixed in an agitated bed in an inert environment before being fed into the thermal reactor in this example. Methane gas was mixed with the silicon particles within the reactor (i.e., the silicon particles were fed dry into the reactor, and the methane gas was fed into the reactor using a separate inlet). The methane gas decomposed into separated components in the reactor including conductive carbon allotropes, which coated and fused (i.e., coalesced, or welded) the silicon particles together forming the SCM. The TEM image 1510 shows the porous morphology of the SCM. The EELS image 1520 shows the elemental map of the SCM shown in 1510. The EELS image 1520 shows the silicon porous media 1530 surrounded by the matrix of carbon ECM 1540.

Example 9

Figure 16A:
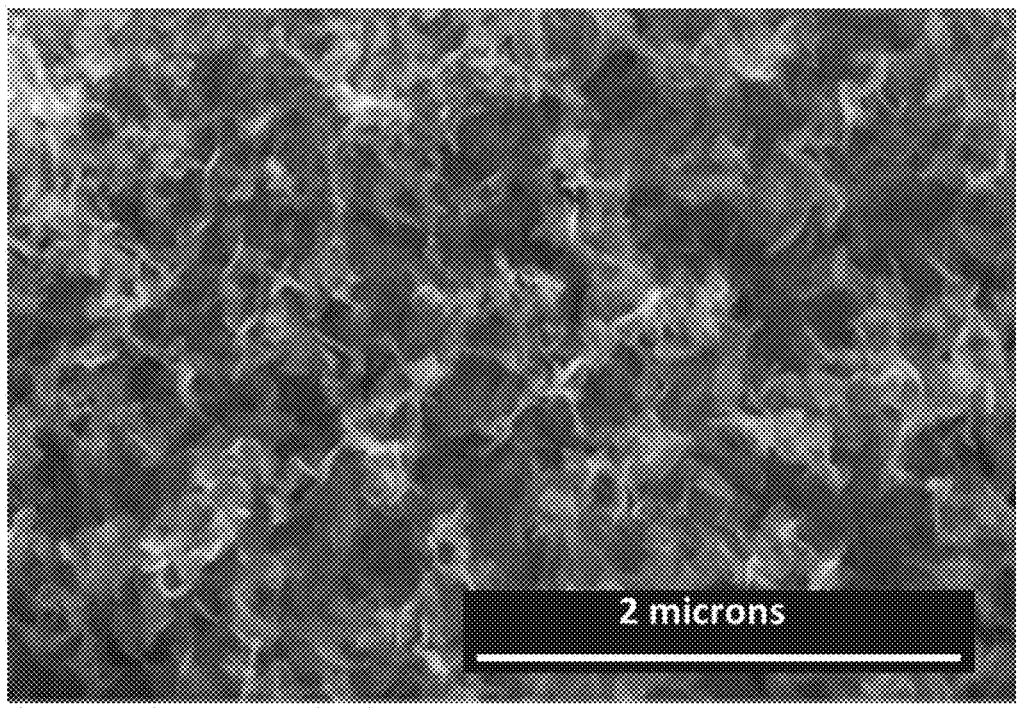
FIG. 16A is an SEM image of an example of a carbon-based porous media produced using a microwave plasma reactor, in accordance with some embodiments.
Figure 16B:
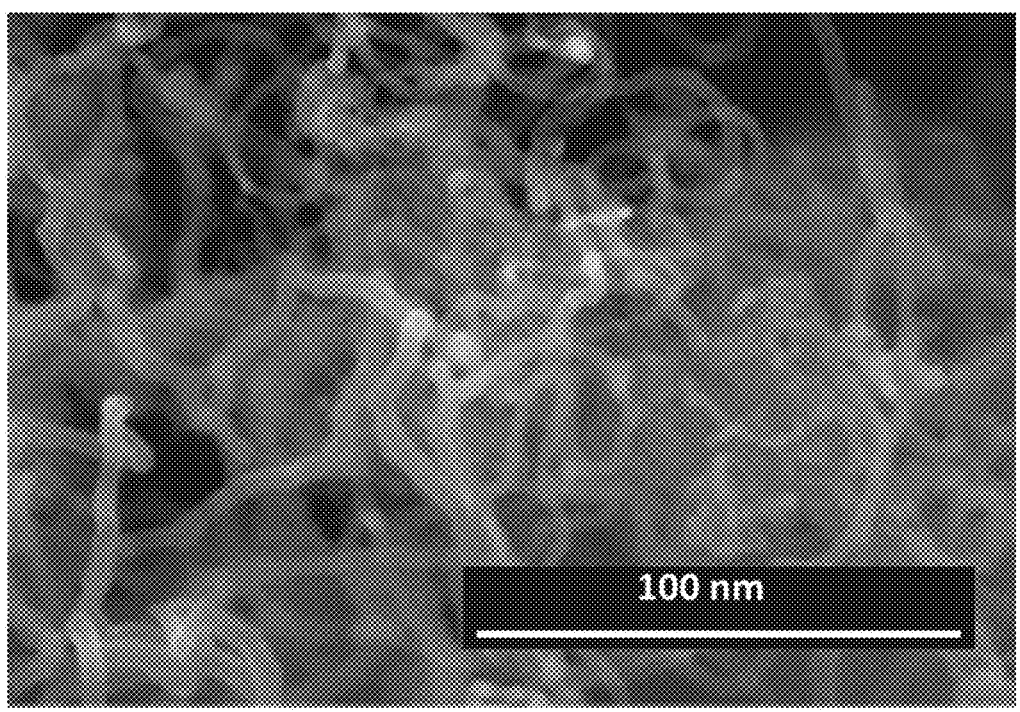
FIG. 16B is an SEM image of an example of carbon-based conductive particles produced using a microwave plasma reactor, in accordance with some embodiments.

In this example, porous media and conductive particles are welded together through the deposition of an ECM, using a process similar to process 200 from FIG. 2A. FIG. 16A is an SEM image of an example of a carbon-based porous media produced using a microwave plasma reactor, as described herein. FIG. 16B is an SEM image of an example of carbon-based conductive particles produced using a microwave plasma reactor, as described herein. The porous media in this example was highly structured, as shown in FIG. 16A, and had a high surface area. The conductive particles in this example had high aspect ratios, as shown by the fibrous structures in FIG. 16B. Both the porous media and conductive particles in this example were produced using a microwave plasma reactor. The carrier fluid in the reactor was a hydrocarbon gas (methane), which decomposed into separated components in the reactor including the carbon allotropes forming the materials in FIGS. 16A and 16B. The main condition that was changed within the microwave plasma reactor to produce the porous media in FIG. 16A or the conductive particles in FIG. 16B was the argon to nitrogen ratio within the reactor. The energy required to ionize argon within the reactor is higher than the energy required to ionize nitrogen, due to the higher ionization potential of argon. When a higher argon to nitrogen ratio was used within the reactor, the more dense, lower surface area, fibrous material in FIG. 16B was produced. And when a lower argon to nitrogen ratio was used within the reactor, the less dense, higher surface area material in FIG. 16 was produced.

Figure 16C:
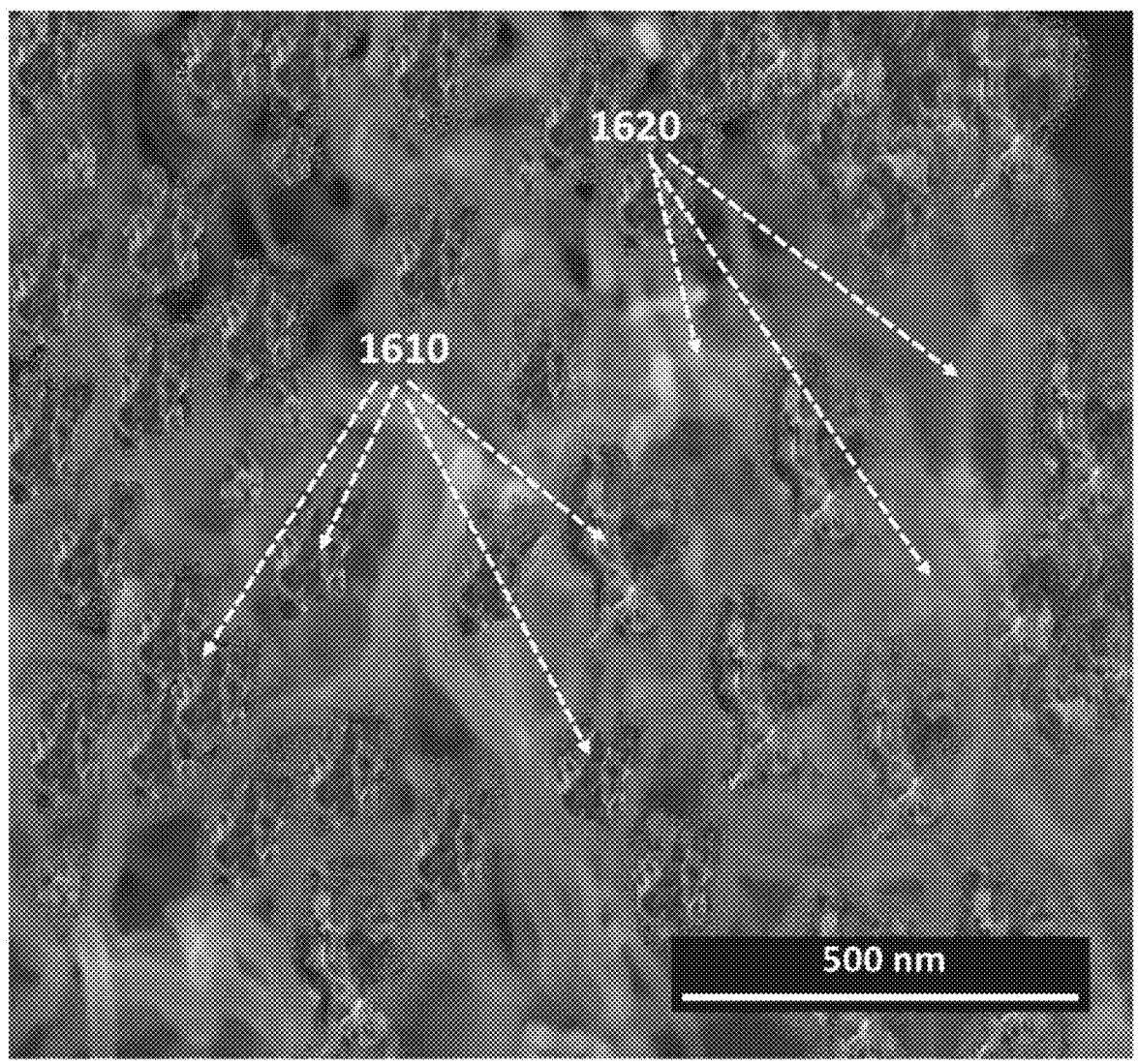
FIG. 16C is an SEM of an SCM produced by welding the porous media in FIG. 16A together with the conductive particles in FIG. 16B using an ECM, in accordance with some embodiments.

FIG. 16C is an SEM of an SCM produced by welding the porous media in FIG. 16A together with the conductive particles in FIG. 16B using an ECM. In this example, a particle drum coater was used to weld the materials together. The porous media and conductive particles in this example were fed into the particle drum coater with a hydrocarbon gas (methane) carrier fluid. The hydrocarbon gas decomposed into separated components in the reactor including a conductive carbon-containing ECM, which coated and fused (i.e., coalesced, or welded) the porous media and conductive particles together to form the SCM in FIG. 16C. The SCM in FIG. 16C has the advantages of both of the constituent particles, namely, it has a high surface area provided by the porous media 1610 and a high electrical conductivity provided by the conductive particles 1620 and the deposited ECM. Furthermore, the high aspect ratio conductive particles 1620 in this example provide mechanical strength to the SCM. The SCM shown in FIG. 16C could be an intermediate product, where the next step would be for an active material (e.g., a battery electrode material) to be conformally deposited within the pores of the SCM.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A structured composite material within a battery electrode, the structured composite material comprising:
   a plurality of aggregates joined together to collectively form a porous media;
   a plurality of conductive particles deposited on the porous media;
   a carbon-based matrix coating the porous media and the plurality of conductive particles, the carbon-based matrix bonding with and joining together the porous media and the plurality of conductive particles to collectively form the structured composite material, wherein the carbon-based matrix is based solely on carbon-carbon bonding, and the bonding between the carbon-based matrix and the porous media is based solely on carbon-carbon bonding; and
   a plurality of pores dispersed along one or more surfaces of the structured composite material.

2. The structured composite material of claim 1, wherein the plurality of pores is configured to confine an electroactive material.

3. The structured composite material of claim 2, wherein the electroactive material includes a lithium-containing compound.

4. The structured composite material of claim 3, wherein the electroactive material includes elemental sulfur, sulfur-containing compounds, lithium nickel manganese cobalt oxide (NCM), lithium iron phosphate (LFP), boron, bromine, platinum, nickel, silver, molybdenum, iron, or any combination thereof.

5. The structured composite material of claim 3, wherein the electroactive material is in a form of a solid, a metal molten liquid, a suspension, a dissolved solution, or any combination thereof.

6. The structured composite material of claim 2, further including one or more surfactant materials deposited on the porous media, the one or more surfactant materials configured to reduce pore clogging of the electroactive material.

7. The structured composite material of claim 6, wherein the one or more surfactant materials includes silver, antimony, amorphous carbon, hydroxy functional groups, or any combination thereof.

8. The structured composite material of claim 1, wherein each of the plurality of aggregates includes a plurality of carbon nanoparticles.

9. The structured composite material of claim 8, wherein each of the carbon nanoparticles includes a plurality of graphene-containing allotropes joined together.

10. The structured composite material of claim 9, wherein the plurality of graphene-containing allotropes includes graphite, graphene platelets, spherical fullerenes, connected spherical fullerenes, graphene-coated spherical fullerenes, carbon nanotubes, carbon nano onions (CNOs), amorphous carbon, or any combination thereof.

11. The structured composite material of claim 10, wherein each graphene platelet includes between 1 and 15 layers of pristine graphene.

12. The structured composite material of claim 10, wherein each graphene platelet has a width between approximately 20 nm and approximately 40 nm.

13. The structured composite material of claim 1, wherein the plurality of conductive particles includes carbon-based particles, metallic particles, conductive oxides, or any combination thereof.

14. The structured composite material of claim 1, wherein each of the plurality of aggregates includes a plurality of silicon-containing particles.

15. The structured composite material of claim 14, wherein one or more of the plurality of silicon-containing particles are amorphous, crystalline, semi-crystalline, nanocrystalline, or poly-crystalline.

16. The structured composite material of claim 14, wherein the plurality of the silicon-containing particles includes silicon, silicon oxide, silica, diatomaceous earth, silicon carbide, lithium-silicon compounds, silicon-carbon composite particles, lithium-silicon-carbon composite particles, or any combination thereof.

17. The structured composite material of claim 16, wherein each of the silicon-carbon composite particles includes a core-shell structure containing silicon and carbon.

18. The structured composite material of claim 16, wherein each of the silicon-carbon composite particles includes a multi-layer structure containing one or more layers of silicon and one or more layers of carbon.

19. The structured composite material of claim 1, wherein the porous media includes one or more dendritic chains, wherein each of the one or more dendritic chains includes a plurality of silicon-containing particles connected with each other.

20. The structured composite material of claim 1, wherein the carbon-based matrix includes a plurality of carbon allotropes interconnected with each other.

21. The structured composite material of claim 20, wherein the plurality of carbon allotropes comprises graphite, graphene, spherical fullerenes, carbon nanotubes, amorphous carbon, or any combination thereof.

22. The structured composite material of claim 1, wherein the plurality of pores includes one or more micropores, mesopores, micropores, nanometer-scale pores, or any combination thereof.

23. The structured composite material of claim 1, further comprising an oxygen-containing material.

* * * * *